(12) United States Patent
Xia et al.

(10) Patent No.: US 10,084,393 B2
(45) Date of Patent: Sep. 25, 2018

(54) CASCADE CONVERTER SYSTEM AND METHOD OF PUTTING CONVERTER MODULE OF THE SAME INTO OPERATION

(71) Applicant: Delta Electronics (Shanghai) CO., LTD, Shanghai (CN)

(72) Inventors: Tao Xia, Shanghai (CN); Cheng Lu, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 0 days.

(21) Appl. No.: 15/871,122

(22) Filed: Jan. 15, 2018

(65) Prior Publication Data

US 2018/0212535 A1 Jul. 26, 2018

(30) Foreign Application Priority Data

Jan. 24, 2017 (CN) .......................... 2017 1 0060106

(51) Int. Cl.
| | |
|---|---|
| *H02M 7/48* | (2007.01) |
| *H02M 7/5387* | (2007.01) |
| *H02M 7/49* | (2007.01) |
| *H02M 1/00* | (2006.01) |
| *H02M 1/32* | (2007.01) |

(52) U.S. Cl.
CPC ........... *H02M 7/5387* (2013.01); *H02M 7/49* (2013.01); *H02M 1/32* (2013.01); *H02M 2001/007* (2013.01); *H02M 2001/0074* (2013.01)

(58) Field of Classification Search
CPC ......... H02M 3/285; H02M 7/49; H02M 7/493
See application file for complete search history.

(56) References Cited

U.S. PATENT DOCUMENTS

2016/0079881 A1* 3/2016 Barbosa .................. H02M 7/49
307/11

* cited by examiner

*Primary Examiner* — Adolf Berhane
*Assistant Examiner* — Afework Demisse
(74) *Attorney, Agent, or Firm* — Yunling Ren

(57) ABSTRACT

A method of putting a converter module of a cascade converter system into operation, wherein the cascade converter system includes: n converter modules; n bypass switch modules; and a system controller, wherein the method includes: a module pre-plug-in step: m bypass switch modules of the n bypass switch modules being in a non-bypass state, and remaining n-m bypass switch modules being in a bypass state, the system controller communicating with the module controllers of the m converter modules, such that the m converter modules operate according to a first control signal, wherein 1≤m<n; a module plug-in step: the system controller controls the (m+1)$^{th}$ bypass switch module to change from the bypass state to the non-bypass state; and a module post-plug-in step: the system controller communicating with the module controllers of the m+1 converter modules, such that the m+1 converter modules operate according to a second control signal.

20 Claims, 24 Drawing Sheets

(a)

(b)

(c)

(a)

(b)

CASCADE CONVERTER SYSTEM AND METHOD OF PUTTING CONVERTER MODULE OF THE SAME INTO OPERATION

CROSS REFERENCE

This application is based upon and claims priority to Chinese Patent Application No. 201710060106.4, filed on Jan. 24, 2017, the entire contents thereof are incorporated herein by reference.

TECHNICAL FIELD

The present disclosure generally relates to a field of power electronic technology, and more particularly, to a cascade converter system and a method of putting a converter module of such a cascade converter system into operation.

BACKGROUND

A cascade converter system has advantages of high power density, high efficiency and easy modularization, which is expected to be widely used in occasions such as data centers and charging piles.

The cascade converter system may be operated in a single-phase or three-phase manner. Each phase is typically formed by cascading a plurality of converter modules. The converter modules may be connected in input-series-output-series, input-series-output-parallel, or other forms. For example, the cascade converter system may be used as a power electronic transformer, and each cascaded converter module may output a square wave or a step wave voltage. By superimposing voltages of these waveforms, it is possible to form a step wave voltage of more levels, to approach a sine wave voltage.

The cascade converter system typically improves its reliability by adding redundant converter modules. For example, when one of the cascaded converter modules fails, the faulty converter module is bypassed to allow it to quit operation, and other modules are still able to function normally, so that the entire system will not stop running.

However, the number of redundant converter modules in the cascade converter system is always limited. When all the redundant converter modules are bypassed due to faults and if still another converter module fails, the whole system will not be able to synthesize a qualified waveform and will quit operation due to the insufficient number of the overall converter modules.

SUMMARY

The present disclosure aims to provide a method of putting a converter module of a cascade converter system into operation, and a cascade converter system operating according to the above method, so as to overcome one or more of the aforesaid problems resulting from limitation and defects of related technologies at least to a certain degree.

The other characteristics and advantages of the present disclosure may become apparent from the following detailed description, or be partly learned from the practice of the present disclosure.

According to one aspect of the present disclosure, a method of putting a converter module of a cascade converter system into operation is provided, wherein the cascade converter system includes:

n converter modules, wherein n>1, each of the converter modules includes a first terminal, a power conversion circuit, a second terminal and a module controller, the first terminal is electrically connected to the power conversion circuit, the power conversion circuit is electrically connected to the second terminal, the power conversion circuit contains at least one DC bus capacitor, and the module controller is configured to control the power conversion circuit;

n bypass switch modules, wherein the n bypass switch modules are connected in series and electrically connected to an AC power source, the first terminals of the n converter modules are correspondingly connected in parallel with the n bypass switch modules, respectively; and a system controller, at least configured to control the n bypass switch modules to be in a bypass state or a non-bypass state, wherein the method includes:

a module pre-plug-in step: m bypass switch modules of the n bypass switch modules being in a non-bypass state, and remaining n-m bypass switch modules being in a bypass state, the system controller communicating with the module controllers of the m non-bypassed converter modules, such that the m non-bypassed converter modules operate according to a first control signal, wherein $1 \leq m < n$;

a module plug-in step: the system controller controlling the $(m+1)^{th}$ bypass switch module to change from the bypass state to the non-bypass state; and a module post-plug-in step: the system controller communicating with the module controllers of the m+1 non-bypassed converter modules, such that the m+1 non-bypassed converter modules operate according to a second control signal.

According to an embodiment, in the module pre-plug-in step, the second terminals of the m non-bypassed converter modules are connected in parallel, and in the module post-plug-in step, the second terminals of the m+1 non-bypassed converter modules are connected in parallel, wherein the first control signal is obtained according to voltages of the DC bus capacitors of the m non-bypassed converter modules and a system voltage reference value, and the second control signal is obtained according to voltages of the DC bus capacitors of the m+1 non-bypassed converter modules and the system voltage reference value.

According to an embodiment, the first control signal contains a first duty cycle signal, the second control signal contains a second duty cycle signal, the first duty cycle signal is obtained according to the system voltage reference value and voltages of the DC bus capacitors of the m non-bypassed converter modules, and the second duty cycle signal is obtained according to the system voltage reference value and voltages of the DC bus capacitors of the m+1 non-bypassed converter modules.

According to an embodiment, the first duty cycle signal D1 and the second duty cycle signal D2 are obtained according to following formula:

$$D1 = \frac{V_{ref}}{\sum_{i=1}^{m} V_{dci}}$$

and $$D2 = \frac{V_{ref}}{\sum_{i=1}^{m+1} V_{dci}}$$

wherein the $V_{ref}$ is the system voltage reference value, and the $V_{dci}$ is a voltage of the DC bus capacitor of the $i^{th}$ converter module.

According to an embodiment, the cascade converter system adopts carrier phase shifting control, in the module pre-plug-in step, carriers of the m converter modules are sequentially shifted by π/m according to the first control signal, and in the module post-plug-in step, carriers of the m+1 converter modules are sequentially shifted by π/(m+1) according to the second control signal.

According to an embodiment, in the module pre-plug-in step, the module controllers of the m non-bypassed converter modules make an adjustment component to be superimposed on the respective first duty cycle ratio signals of the m non-bypassed converter modules, and the adjustment component is obtained according to a voltage of the DC bus capacitor of the corresponding converter module.

According to an embodiment, the power conversion circuit contains an AC-DC conversion circuit and a DC-DC converter circuit, the AC-DC conversion circuit is electrically connected to the first terminal and the DC bus capacitor, and the DC-DC conversion circuit is electrically connected to the second terminal and the DC bus capacitor.

According to an embodiment, the cascade converter system further includes an auxiliary power source, configured to be electrically connected to the module controller of the $(m+1)^{th}$ converter module and supply power.

According to an embodiment, the power conversion circuit contains an AC-DC conversion circuit, configured to be electrically connected to the first terminal and the DC bus capacitor, the module plug-in step further includes:

a pre-charging step, after the $(m+1)^{th}$ bypass switch module is changed from the bypass state to the non-bypass state, the AC power source charging the DC bus capacitor of the $(m+1)^{th}$ converter module through the AC-DC conversion circuit.

According to an embodiment, the pre-charging step further includes:

the system controller communicating with the module controllers of the m non-bypassed converter module, such that the m non-bypassed converter modules operating according to a third control signal, and the third control signal containing a third duty cycle signal obtained according to following formula:

$$D3 = \frac{v_{ref} - \text{sgn}(i_g)v_{m+1}}{\sum_{i=1}^{m} v_{dci}}$$

wherein the $V_{ref}$ is a system voltage reference value, the sgn ( ) is a symbol function, the $i_g$ is a current through the first terminal of the $(m+1)^{th}$ converter module, the $V_{dci}$ is the voltage of the DC bus capacitor of the $i^{th}$ converter module, and the $V_{m+1}$ represents a value of a voltage of the DC bus capacitor of the $(m+1)^{th}$ converter module.

According to an embodiment, the pre-charging step further includes:

the system controller communicating with the module controller of the $(m+1)^{th}$ converter module to acquire the $V_{m+1}$, wherein the $V_{m+1}$ is a sampled value of the voltage of the DC bus capacitor of the $(m+1)^{th}$ converter module by the module controller of the $(m+1)^{th}$ converter module.

According to an embodiment, the cascade converter system adopts carrier phase shifting control, in the module pre-plug-in step, carriers of the m non-bypassed converter modules are sequentially shifted by π/m according to the first control signal, and in the module plug-in step, carriers of the m non-bypassed converter modules are sequentially shifted by π/m according to the third control signal, and in the module post-plug-in step, carriers of the m+1 non-bypassed converter modules are sequentially shifted by π/(m+1) according to the second control signal.

According to an embodiment, the power conversion circuit contains an AC-DC conversion circuit, the AC-DC conversion circuit is electrically connected to the first terminal and the DC bus capacitor, the module controller is electrically connected to the DC bus capacitor, and the DC bus capacitor supplies power for the module controller, wherein the module plug-in step further includes:

a pre-charging step, after the $(m+1)^{th}$ bypass switch module is changed from the bypass state to the non-bypass state, the AC power source charging the DC bus capacitor of the $(m+1)^{th}$ converter module through the AC-DC conversion circuit.

According to an embodiment, the pre-charging step further includes:

before the DC bus capacitor of the $(m+1)^{th}$ converter module is charged to a first voltage value, the system controller communicating with the module controllers of the m non-bypassed converter modules, such that the m non-bypassed converter modules operate according to a third control signal, respectively, wherein the first voltage value is a minimum threshold of an operating voltage of the module controller of the $(m+1)^{th}$ converter module, the third control signal contains a third duty cycle signal, the third duty cycle signal is obtained according to the system voltage reference value, voltages of the DC bus capacitors of m non-bypassed converter modules, and a value representing a voltage of the DC bus capacitor of the $(m+1)^{th}$ converter module.

According to an embodiment, the third duty cycle signal is obtained according to following formula:

$$D3 = \frac{v_{ref} - \text{sgn}(i_g)v_{m+1}}{\sum_{i=1}^{m} v_{dci}}$$

wherein the $V_{ref}$ is a system voltage reference value, the sgn ( ) is a symbol function, the $i_g$ is a current through the first terminal of the $(m+1)^{th}$ converter module, the $V_{dci}$ is the voltage of the DC bus capacitor of the $i^{th}$ converter module, and the $V_{m+1}$ represents the voltage of the DC bus capacitor of the $(m+1)^{th}$ converter module.

According to an embodiment, the $V_{m+1}$ is a predicted value of the voltage of the DC bus capacitor of the $(m+1)^{th}$ converter module, and obtained according to a time integral of the current through the first terminal of the $(m+1)^{th}$ converter module and a capacitance value of the DC bus capacitor of the $(m+1)^{th}$ converter module.

According to an embodiment, the $V_{m+1}$ is obtained according to following formula:

$$v_{m+1} = \frac{\int_{t_0}^{t} i_g \, dt}{C_{ini}}$$

wherein the $t_0$ is a moment at which the system controller controls the $(m+1)^{th}$ bypass switch module to change from the bypass state to the non-bypass state, the t is a time period during which the DC bus capacitor of the $(m+1)^{th}$ converter module is charged, and the $C_{ini}$ is the capacitance value of the DC bus capacitor of the $(m+1)^{th}$ converter module.

According to an embodiment, the cascade converter system adopts carrier phase shifting control, in the module pre-plug-in step, carriers of the m non-bypassed converter modules are sequentially shifted by $\pi/m$ according to the first control signal, in the module plug-in step, carriers of the m non-bypassed converter modules are sequentially shifted by $\pi/m$ according to the third control signal, and in the module post-plug-in step, carriers of the m+1 non-bypassed converter modules are sequentially shifted by $\pi/(m+1)$ according to the second control signal.

According to another aspect of the present disclosure, a cascade converter system is provided, including:

n converter modules, wherein n>1, each of the converter modules includes a first terminal, a power conversion circuit, a second terminal and a module controller, the first terminal is electrically connected to the power conversion circuit, the power conversion circuit is electrically connected to the second terminal, the power conversion circuit contains at least one DC bus capacitor, and the module controller is configured to control the power conversion circuit;

n bypass switch modules, wherein the n bypass switch modules are connected in series and electrically connected to an AC power source, the first terminals of the n converter modules are correspondingly connected in parallel with the n bypass switch modules, respectively; and a system controller, at least configured to control the n bypass switch modules to be in a bypass state or a non-bypass state, wherein the cascade converter system operates according to any one of the above-described methods.

For the purpose of further understanding the features and technical contents of the present disclosure, reference is made to the following detailed description and the accompanying drawings of the present disclosure. However, the detailed description and accompanying drawings herein are intended to be illustrative of the present disclosure and are not intended to make any restrictions on the scope of the claims of the present disclosure.

BRIEF DESCRIPTION OF THE DRAWINGS

The above and other features and advantages of the present disclosure will become more apparent by describing its exemplary embodiments in detail with reference to the accompanying drawings.

DETAILED DESCRIPTION

Figure 1A:
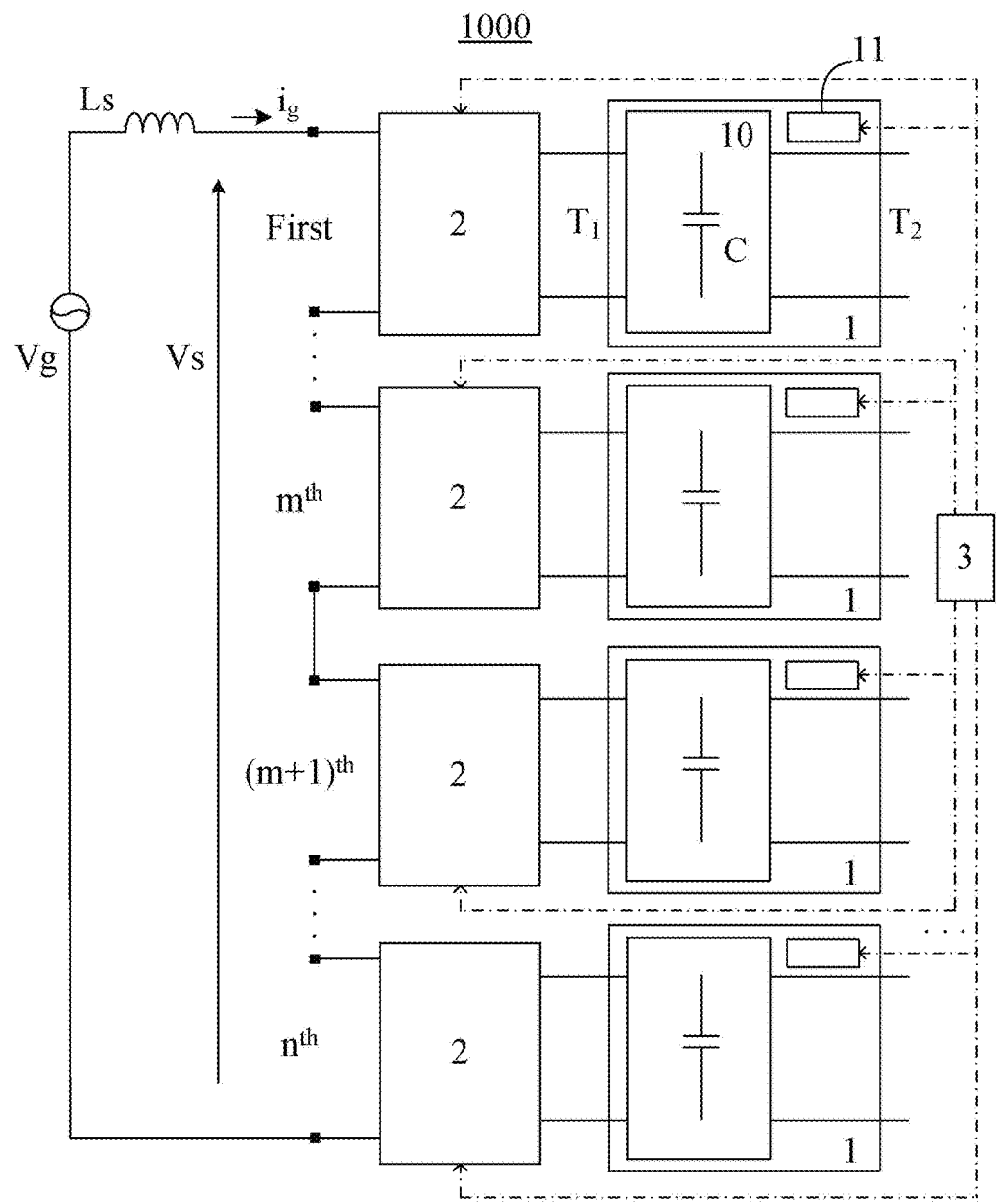
FIG. 1A is a schematic diagram of one embodiment of a cascade converter system of the present application.

Exemplary embodiments will now be described more fully with reference to the drawings. The exemplary embodiments, however, may be implemented in various forms, and should not be construed as been limited to the implementations set forth herein; instead, the implementations are provided such that the present disclosure will be thorough and complete, and will fully convey the concept of exemplary embodiments to those skilled in the art. In the drawings, the same reference signs denote the same or similar structures, thus their detailed description will be omitted.

In addition, the features, structures or characteristics described herein can be combined in one or more embodiments in any appropriate way. In the description hereinafter, many specific details are provided for fully understanding of the embodiments of the present disclosure. However, it will be appreciated by those skilled in the art that the technical solution of the present disclosure can be practiced without one or more of the specific details, or with other structures, components, steps or methods, etc. In addition, known structures, components or operations will not be illustrated or described in detail, to avoid obscuration of the aspects of the present disclosure.

Various embodiments and advantages of the present application will be described in more detail with reference to FIGS. 1A to 18.

FIG. 1A is a schematic diagram of one embodiment of a cascade converter system of the present application. As shown in FIG. 1A, the cascade converter system 1000 of the present embodiment includes: n converter modules 1, n bypass switch modules 2 and a system controller 3. Herein, n>1. In practical applications, in order to improve the accuracy of output waveforms, n is usually much larger than one, for example greater than eight. The suspension points in FIG. 1A denote a plurality of corresponding devices not shown. For convenience of explanation, a single-phase system is taken as an example. However, the present application is not limited to a single-phase system.

These n converter modules 1 are the first, . . . , $m^{th}$, $(m+1)^{th}$, $n^{th}$ converter modules 1 as shown in FIG. 1A. The n converter modules 1 may be various known power converter circuits, which have substantially the same structure as each other, or are at least interchangeable with each other. Each converter module 1 at least includes: a first terminal $T_1$, a power conversion circuit 10, a second terminal $T_2$ and a module controller 11. In the embodiment, the first terminal $T_1$ is electrically connected to the power conversion circuit 10, the power conversion circuit 10 is electrically connected to the second terminal $T_2$, the power conversion circuit 10 at least contains at least one DC bus capacitor C, and the module controller 11 is configured to control the power conversion circuit 10. Without affecting the understanding, in order to make the drawings clean, reference numerals of internal components of only the first converter module 1 are indicated in the drawings, and reference numerals of the same internal components of other converter modules 1 are omitted. The following drawings also employ such processing.

For example, as an embodiment, the module controller 11 is in charge of local control and protection of each converter module 1, and converts received control signal into a pulse width modulation (PWM) driving signal, to drive the switches, such as power transistors, of the converter module 1.

For example, as another embodiment, the system controller 3 generates pulse width modulation driving signals of respective converter modules 1. The module controller 11 is in charge of local control and protection of each converter module 1, and receives the pulse width modulation driving signal, to drive the power transistor of the converter module 1. The invention is not limited thereto.

The n bypass switch modules 2 are the first, . . . , $m^{th}$, $(m+1)^{th}$, . . . , $n^{th}$ bypass switch modules 2 as shown in FIG. 1A. The n bypass switch modules 2 may be various known switch circuits, which have substantially the same structure as each other, or are at least interchangeable with each other, and their arrangement order may also be adjusted. The present disclosure is not limited thereto. The n bypass switch modules 2 are connected in series and then electrically connected to an AC power source $V_g$. The respective first terminals $T_1$ of the aforementioned n converter modules 1 are correspondingly connected in parallel with the n bypass switch modules 2, respectively.

The system controller 3 may be implemented by using various hardware, software, firmware, or a combination thereof, configured to control the aforementioned n bypass switch modules 2 to be in a bypass state or a non-bypass state, and send various control signals to the aforementioned n module controllers 11. The dotted lines drawn from the system controller 3 in FIG. 1A indicate the transmission of the control signals.

Figure 1B:
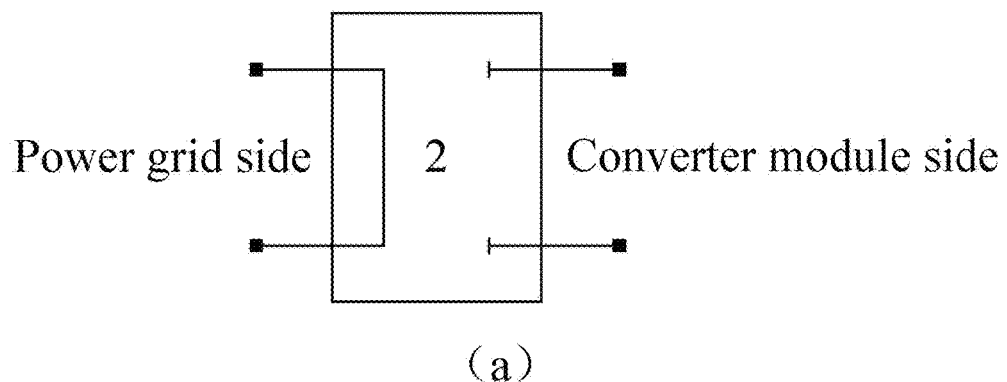
FIG. 1B is a schematic diagram illustrating states of the bypass switch module 2 of the present application.
Figure 1B:
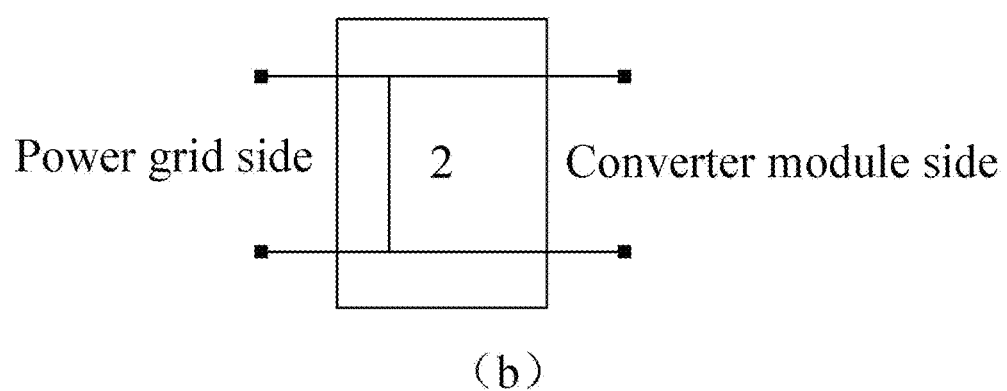
Figure 1B:
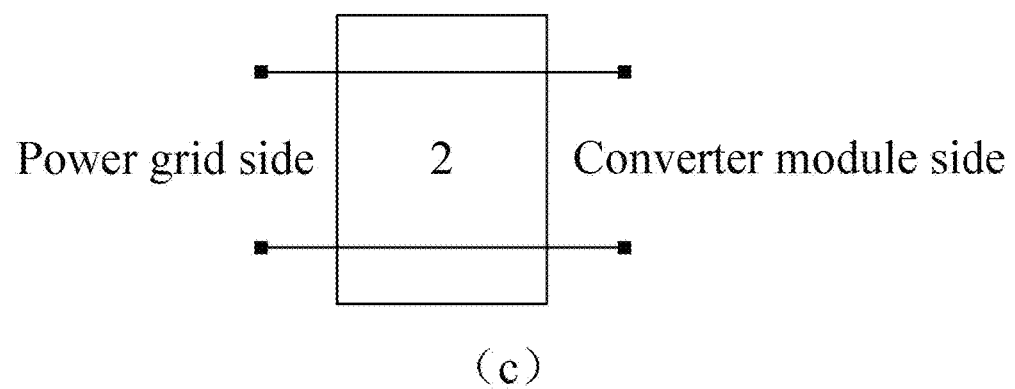

FIG. 1B is a schematic diagram illustrating states of the bypass switch module 2 of the present application. As shown in FIG. 1B, the sub-graph (a) shows a bypass state of the bypass switch module 2, indicating that the bypass switch module 2 is conducted for a power grid side where the power source Vg is connected, and the grid side is disconnected from the converter module side as the grid side is bypassed by the bypass switch module 2. The sub-graph (b) shows another bypass state of the bypass switch module 2, indicating that the presence of the converter module 1 is ignored and the bypass switch module 2 is conducted for the grid side, because the bypass switch module 2 short-circuits a connection terminal of the converter module side. The sub-graph (c) shows a non-bypass state of the bypass switch module 2, indicating that the bypass switch module 2 connects the grid side and the converter module side together. As shown in FIG. 1B, the bypass switch module 2 being in the bypass state makes the corresponding converter module 1 not be able to be added to the converter module cascade, while the bypass switch module 2 being in the non-bypass state makes the corresponding converter module 1 be able to be added to the converter module cascade system.

Figure 1C:
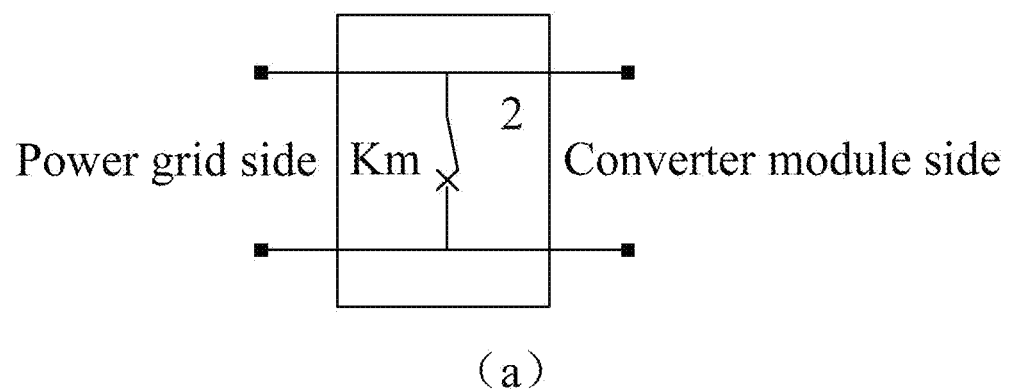
FIG. 1C is a schematic diagram illustrating structures of the bypass switch module 2 of the present application.
Figure 1C:
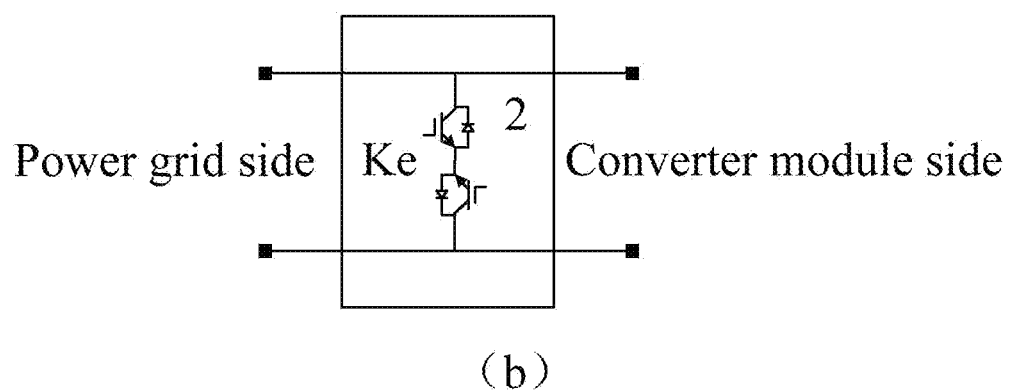

FIG. 1C is a schematic diagram illustrating structures of the bypass switch module 2 of the present application. As shown in FIG. 1C, the sub-graph (a) shows that the bypass switch module 2 may implement its bypass state or non-bypass state through a mechanical switch Km across lines. The sub-graph (b) shows that the bypass switch module 2 may implement its bypass state or non-bypass state through an electronic switch Ke across lines.

In addition, in FIG. 1A, an inductor Ls is connected in series between the power source Vg and the cascade converter system 1000 of the present embodiment, for current limiting and filtering. A phase voltage actually applied to the cascade converter system 1000 of the present embodiment by the power source Vg via the inductor Ls is Vs, and the corresponding phase current is $i_g$.

The system controller 3 not only controls respective bypass switch modules 2, but also controls respective converter modules 1 via respective module controllers 11, such that the cascade converter system 1000 of the present embodiment is configured to operate according to the method of putting a converter module of a cascade converter system into operation of the present invention described in detail hereinafter.

Figure 2A:
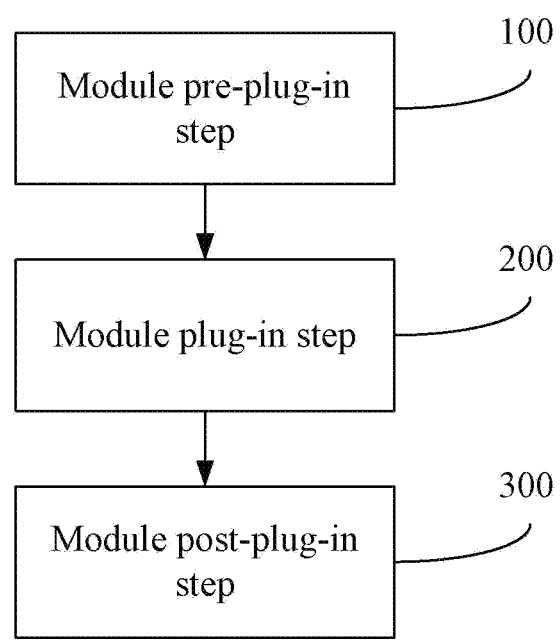
FIG. 2A is a flow chart of one embodiment of a method of putting a converter module of a cascade converter system into operation of the present application.

FIG. 2A is a flow chart of one embodiment of a method of putting a converter module of a cascade converter system into operation of the present application. Combining with the aforementioned FIG. 1A, as shown in FIG. 2A, the method of putting a converter module of a cascade converter system into operation of the present embodiment includes: a module pre-plug-in step 100, a module plug-in step 200 and a module post-plug-in step 300. Without affecting the understanding, steps with the same reference numerals in the description and drawings have substantially the same technical features, in order to make the description and drawings clean.

In the module pre-plug-in step 100, m bypass switch modules 2 of the n bypass switch modules 2 are in a non-bypass state, and remaining n-m (n minus m) bypass switch modules 2 are in a bypass state, the system controller 3 communicates with the module controllers 11 of the corresponding m converter modules 1, such that the m converter modules 1 operate according to a first control signal, wherein 1≤m<n.

In the module plug-in step 200, the system controller 3 controls the $(m+1)^{th}$ bypass switch module 2 to change from the bypass state to the non-bypass state.

In the module post-plug-in step 300, the system controller 3 communicates with the aforementioned module controllers 11 of the m+1 converter modules, such that the m+1 converter modules operate according to a second control signal.

Figure 2B:
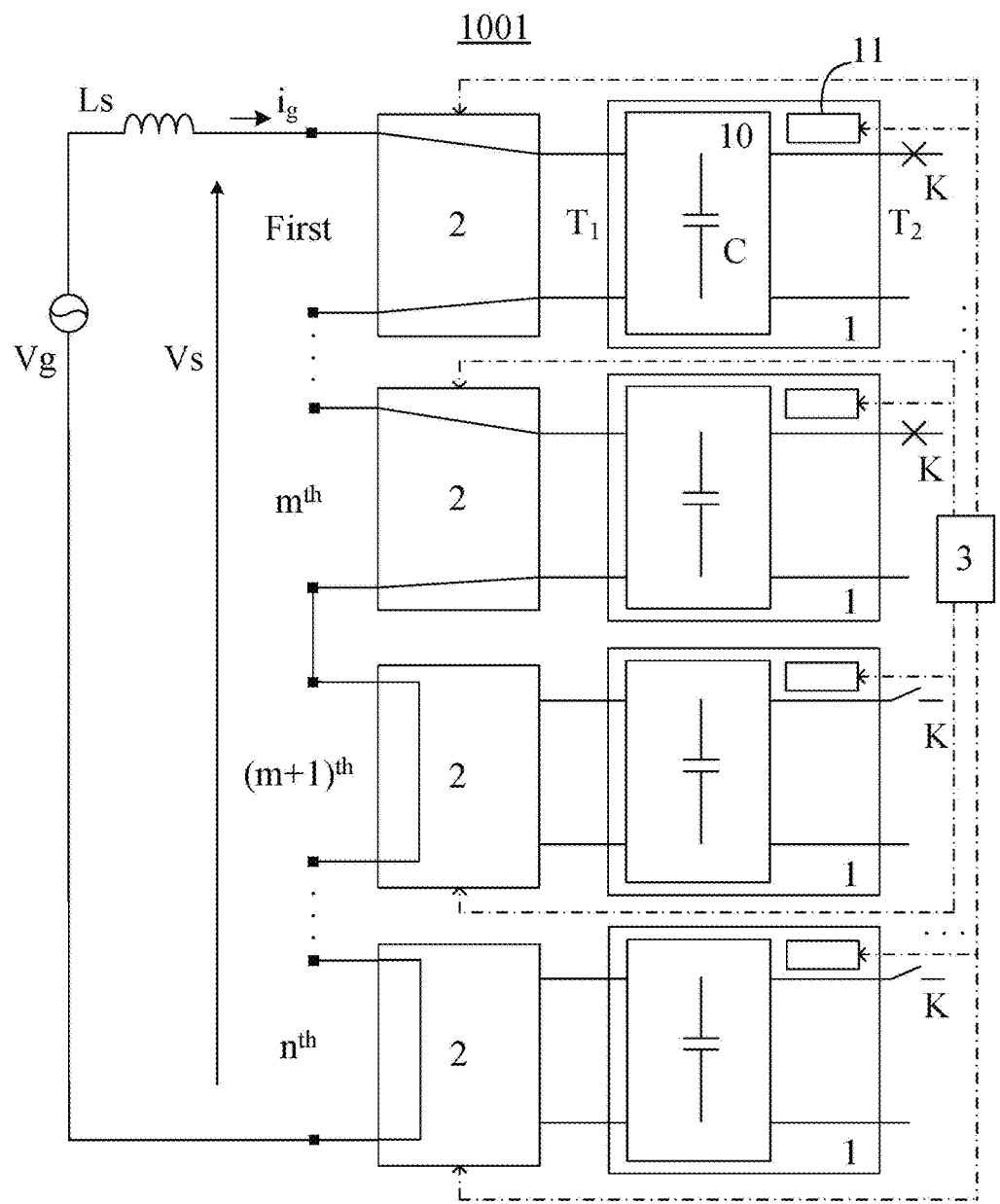
FIGS. 2B-2D are schematic diagrams respectively illustrating corresponding states of another embodiment of the cascade converter system in the module pre-plug-in step 100, module plug-in step 200 and module post-plug-in step 300 of the present application.
Figure 2C:
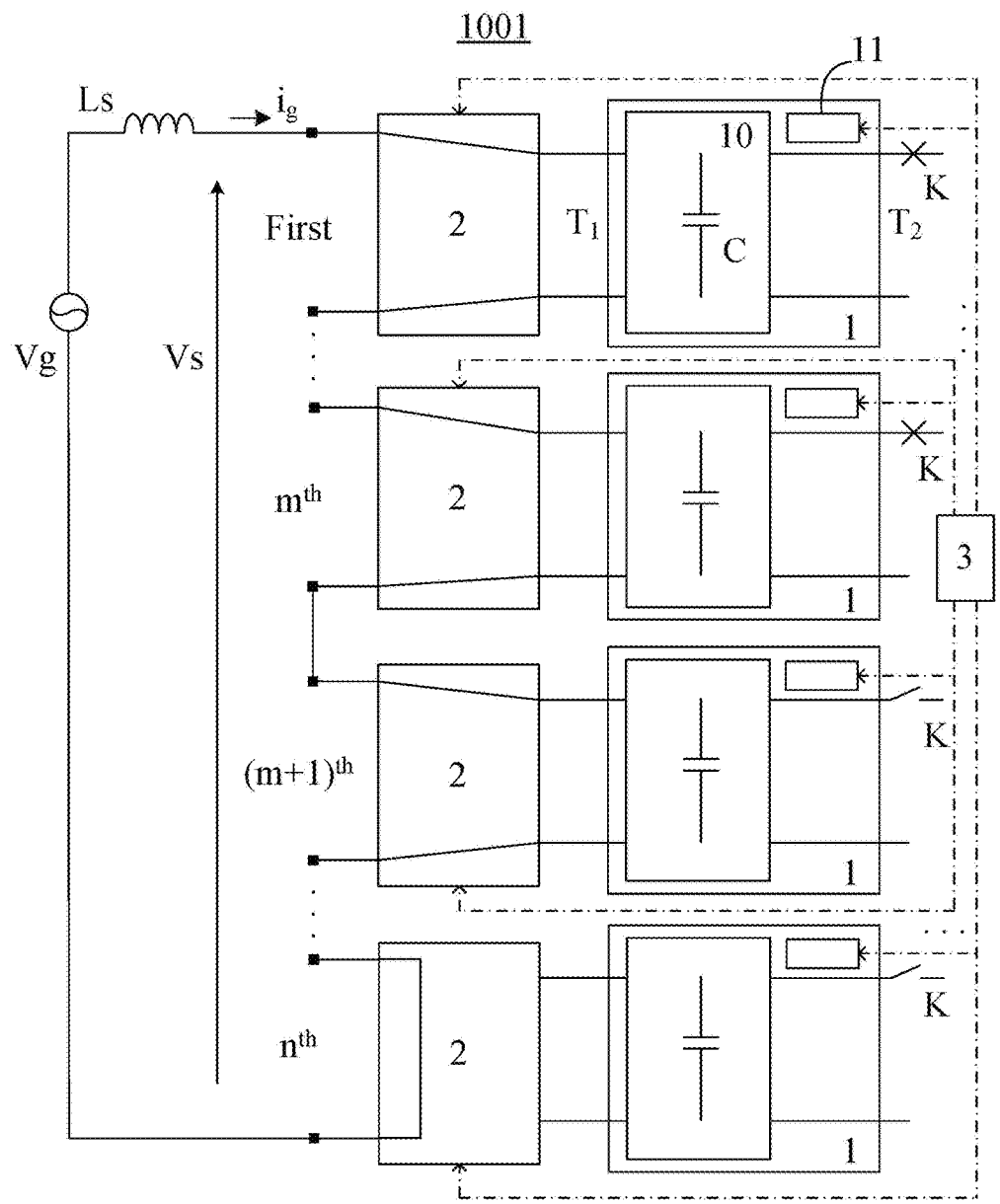
Figure 2D:
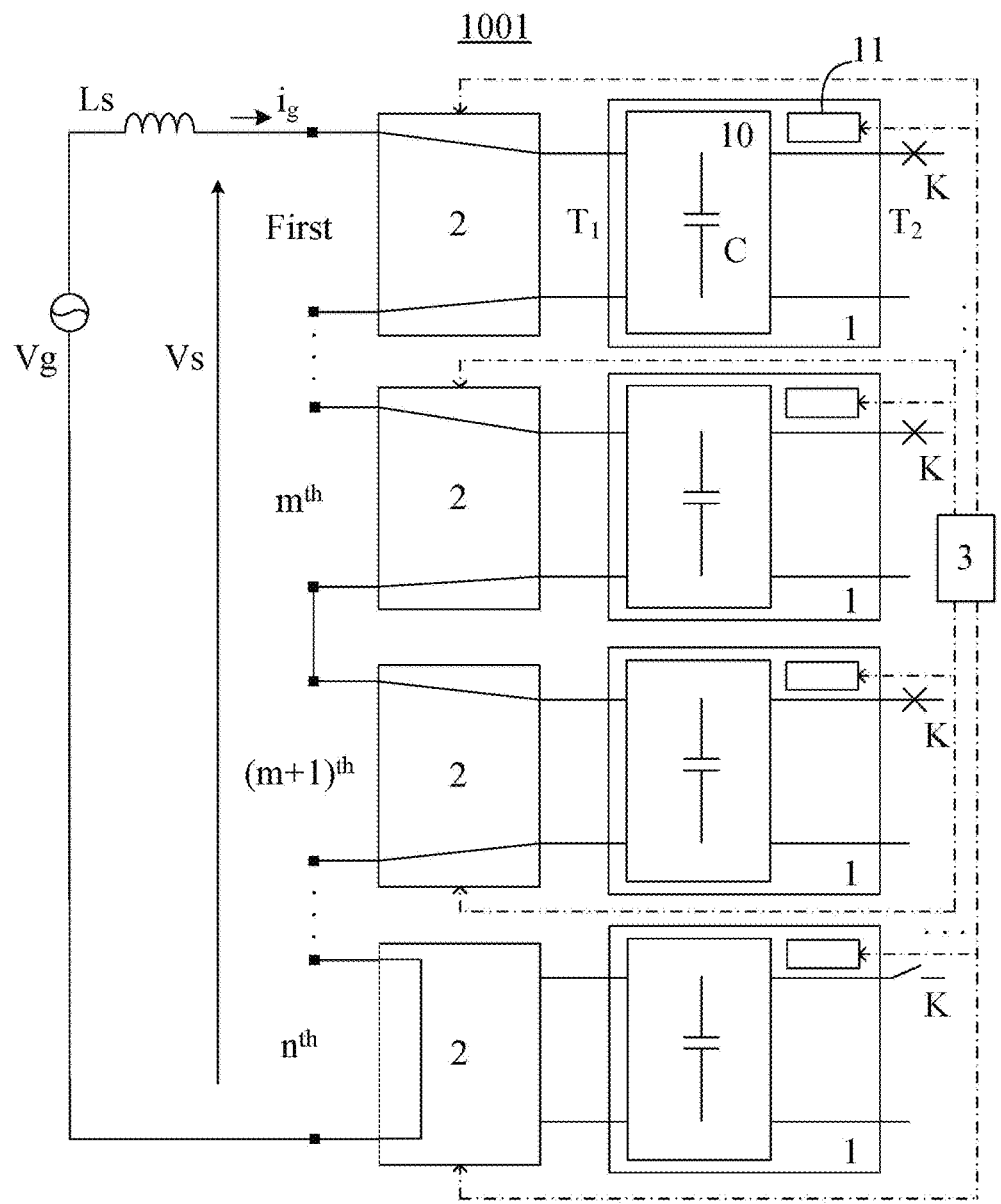

FIGS. 2B-2D are schematic diagrams respectively illustrating corresponding states of another embodiment of the cascade converter system in the module pre-plug-in step 100, module plug-in step 200 and module post-plug-in step 300 of the present application.

For convenience of explanation, a switch K is provided on the second terminal $T_2$ of each converter module of the cascade converter systems 1001 in FIGS. 2B-2D.

As shown in FIG. 2B, in the module pre-plug-in step 100, the first bypass switch module 2 to the $m^{th}$ bypass switch module 2 are in a non-bypass state, the switches K on the second terminals $T_2$ of the first converter module 1 to the $m^{th}$ converter module 1 are in closed states. The $(m+1)^{th}$ bypass switch module 2 to the $n^{th}$ bypass switch module 2 are in a bypass state, the switches K on the second terminals $T_2$ of the $(m+1)^{th}$ converter module 1 to the $n^{th}$ converter module 1 are in open states. That is, only the aforementioned first converter module 1 to the $m^{th}$ converter module 1 in the system are in operation at this stage.

FIG. 2C differs from FIG. 2B in that, the aforementioned $(m+1)^{th}$ bypass switch module 2 is in the bypass state and the operation of the system enters the module plug-in step 200. However, before the $(m+1)^{th}$ converter module 1 can output a normal operating voltage, the switch K on the second terminal $T_2$ of the $(m+1)^{th}$ converter module 1 is in an open state, so as not to affect output of the entire system.

FIG. 2D differs from FIG. 2C in that, since the aforementioned $(m+1)^{th}$ converter module 1 has been able to output a normal operating voltage, the switch K on the second terminal $T_2$ of the $(m+1)^{th}$ converter module 1 is in a closed state, such that the $(m+1)^{th}$ converter module 1 completely joins the cascade formed by the converter modules 1 of the phase. That is, the phase is changed from the previous cooperative operation of m converter modules 1 to the current cooperative operation of m+1 converter modules 1, i.e., a hot plug-in process, i.e., a putting process, of the $(m+1)^{th}$ converter module 1 is completed.

Figure 3:
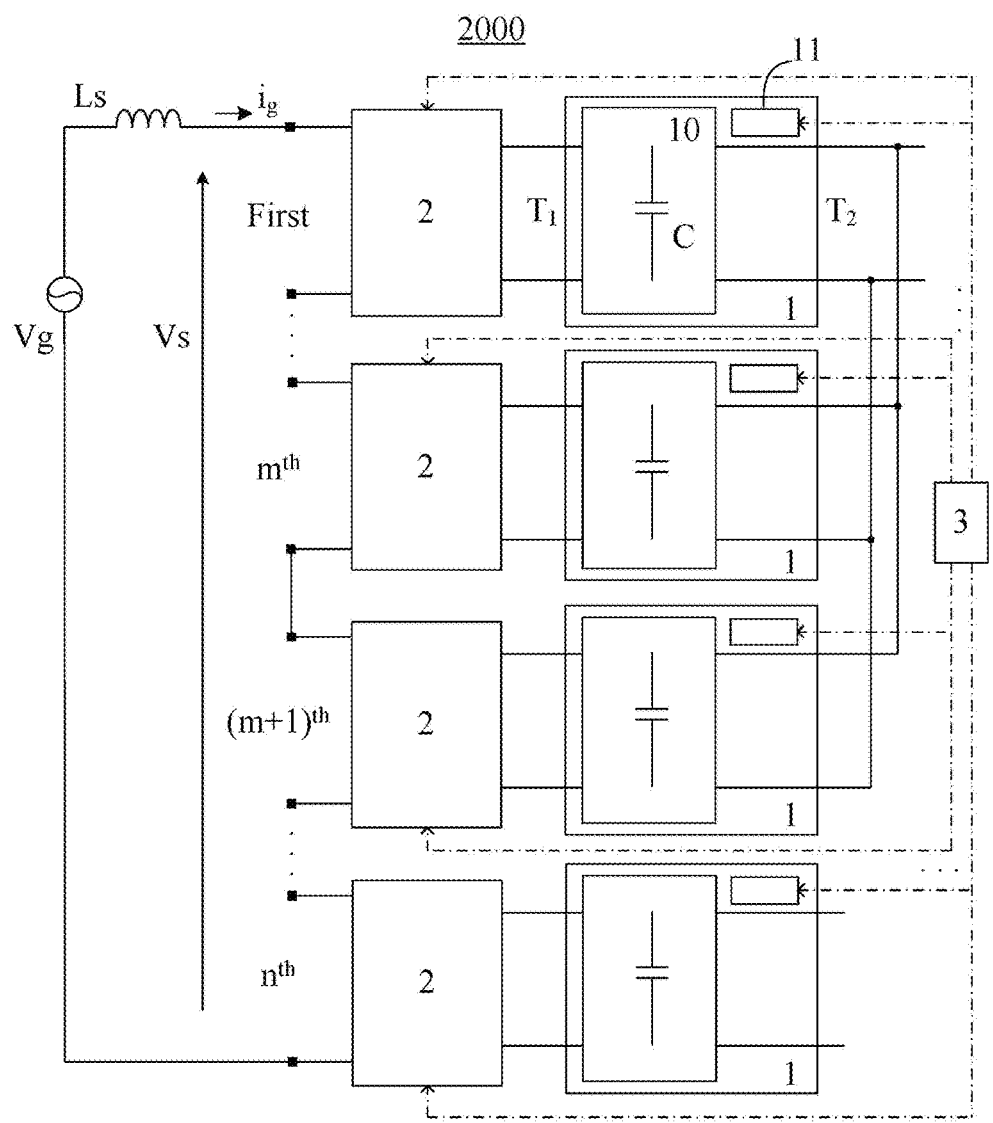
FIG. 3 is a schematic diagram of yet another embodiment of a cascade converter system of the present application.
Figure 4:
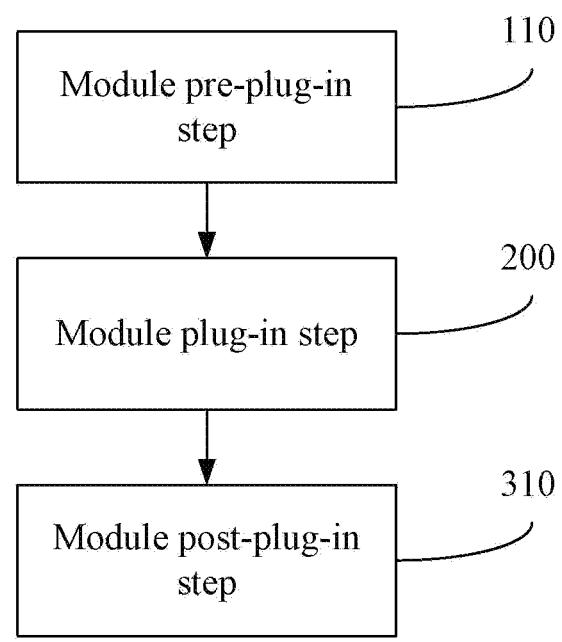
FIG. 4 is a flow chart of yet another embodiment of a method of putting a converter module of a cascade converter system into operation of the present application corresponding to the cascade converter system of FIG. 3.

FIG. 3 is a schematic diagram of yet another embodiment of a cascade converter system of the present application. FIG. 4 is a flow chart of yet another embodiment of a method of putting a converter module of a cascade converter system into operation of the present application corresponding to the cascade converter system of FIG. 3. Combining with FIG. 3, as shown in FIG. 4, the method of putting a converter module of a cascade converter system into operation of the present embodiment includes: a module pre-plug-in step 110, a module plug-in step 200 and a module post-plug-in step 310.

In the module pre-plug-in step 110, the second terminals $T_2$ of the m converter modules 1 are connected in parallel.

In the module post-plug-in step 310, the second terminals $T_2$ of the m+1 converter modules 1 are connected in parallel.

The aforementioned first control signal is obtained according to voltages of the DC bus capacitors C of the m converter modules 1 and a system voltage reference value $V_{ref}$, and the aforementioned second control signal is obtained according to voltages of the DC bus capacitors C of the m+1 converter modules and the system voltage reference value $V_{ref}$. Herein, in this embodiment, the system voltage reference value $V_{ref}$ is a reference voltage of the phase, that is, an expected value or a set value of Vs shown in FIGS. 1A to 3.

As another embodiment of the method of putting a converter module of a cascade converter system into operation according to the present application, the aforementioned first control signal contains a first duty cycle signal D1 of respective converter modules 1, the aforementioned second control signal contains a second duty cycle signal D2 of respective converter modules 1. The first duty cycle signal D1 is obtained according to the system voltage reference value $V_{ref}$ and voltages of the DC bus capacitors C of the m converter modules 1, and the second duty cycle signal D2 is obtained according to the system voltage reference value $V_{ref}$ and voltages of the DC bus capacitors C of the m+1 converter modules 1.

As another embodiment of the method of putting a converter module of a cascade converter system into operation according to the present application, the first duty cycle signal D1 and the second duty cycle signal D2 are obtained according to following formula:

$$D1 = \frac{V_{ref}}{\sum_{i=1}^{m} V_{dci}}$$

and $$D2 = \frac{V_{ref}}{\sum_{i=1}^{m+1} V_{dci}}$$

wherein the $V_{ref}$ is the aforementioned system voltage reference value, the $V_{dci}$ is a voltage of the DC bus capacitor C of the $i^{th}$ converter module 1, such as a voltage sampled value of the DC bus capacitor C of the cascaded $i^{th}$ converter module 1, i.e., an operating voltage of the $i^{th}$ converter module 1. Herein, the number of converter module the $1^{st}$, $2^{nd}$, ... $i^{th}$, ... $m^{th}$, $(m+1)^{th}$, ... or the $n^{th}$ is not limited to the system structure order, and it may be marked as any one in the system structure.

As another embodiment of the cascade converter system of the present application, the cascade converter system of the present application adopts carrier phase shifting modulation. In this way, In addition to controlling the first and second duty cycle signals of respective converter modules 1 before and after the aforementioned $(m+1)^{th}$ converter module 1 is put into the cascade converter system, the system controller may also control phases of carriers of respective converter modules 1 before and after the aforementioned (m+1)$^{th}$ converter module 1 is put into the cascade converter system.

Figure 5:
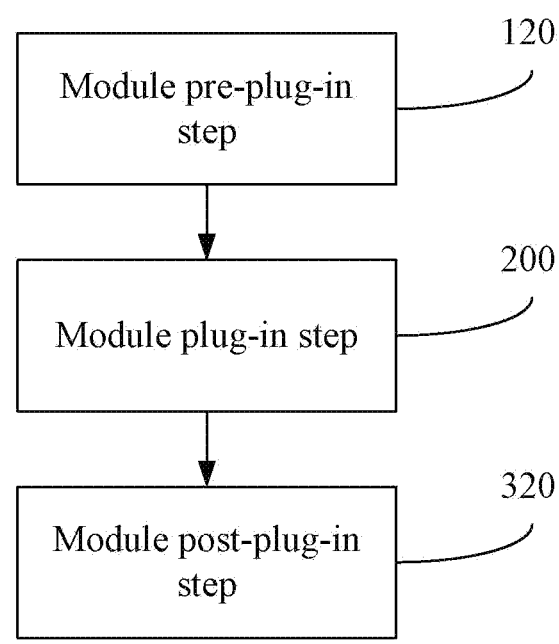
FIG. 5 is a flow chart of yet another embodiment of a method of putting a converter module of a cascade converter system into operation of the present application corresponding to the cascade converter system which adopts carrier phase shifting control.

FIG. 5 is a flow chart of yet another embodiment of a method of putting a converter module of a cascade converter system into operation of the present application corresponding to the cascade converter system which adopts carrier phase shifting control. Combining with the aforementioned FIG. 3, as shown in FIG. 5, the method of putting a converter module of a cascade converter system into operation of the present embodiment includes: a module pre-plug-in step 120, a module plug-in step 200 and a module post-plug-in step 320.

In the module pre-plug-in step 120, carriers of the m converter modules 1 are sequentially shifted by π/m according to the first control signal.

In the module post-plug-in step 320, carriers of the m+1 converter modules 1 are sequentially shifted by π/(m+1) according to the second control signal.

Figure 6:
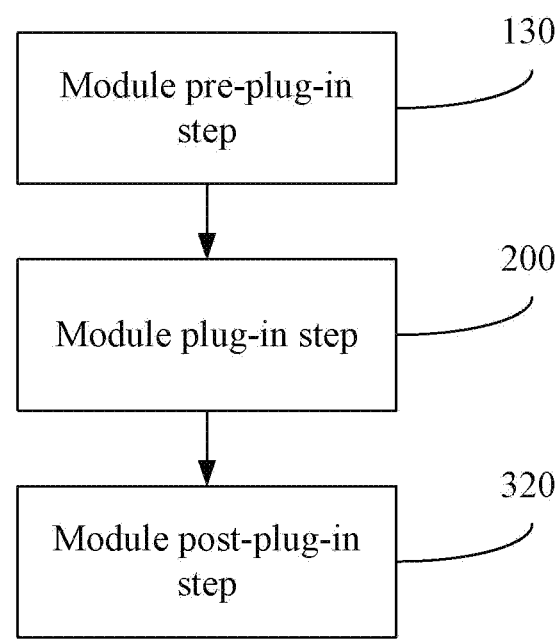
FIG. 6 is a flow chart of yet another embodiment of a method of putting a converter module of a cascade converter system into operation of the present application.

FIG. 6 is a flow chart of yet another embodiment of a method of putting a converter module of a cascade converter system into operation of the present application. Combining with the aforementioned FIG. 3, as shown in FIG. 6, the method of putting a converter module of a cascade converter system into operation of the present embodiment includes: a module pre-plug-in step 130, a module plug-in step 200 and a module post-plug-in step 320.

In the module pre-plug-in step 130, among any one of the m converter modules 1, the corresponding module controller 11 may make an adjustment component ΔD to be superimposed on its first duty cycle ratio signal D1 which is sent from the system controller 3, and the adjustment component ΔD may be obtained according to the voltage of the DC bus capacitor C of the corresponding converter module 1, by using the feedback adjustment control manners, such as the proportion control, the proportional-integral control and the like, and this is not specifically limited to the present embodiment.

In an embodiment, the voltage on the DC bus capacitor C of the converter module 1 has been pre-charged to a value near the rated value where the converter module 1 may operate normally, before the converter module 1 is put into the cascade converter system, and the module controller 11 has also been able to operate normally. The present application does not limit its specific implementation.

Figure 7A:
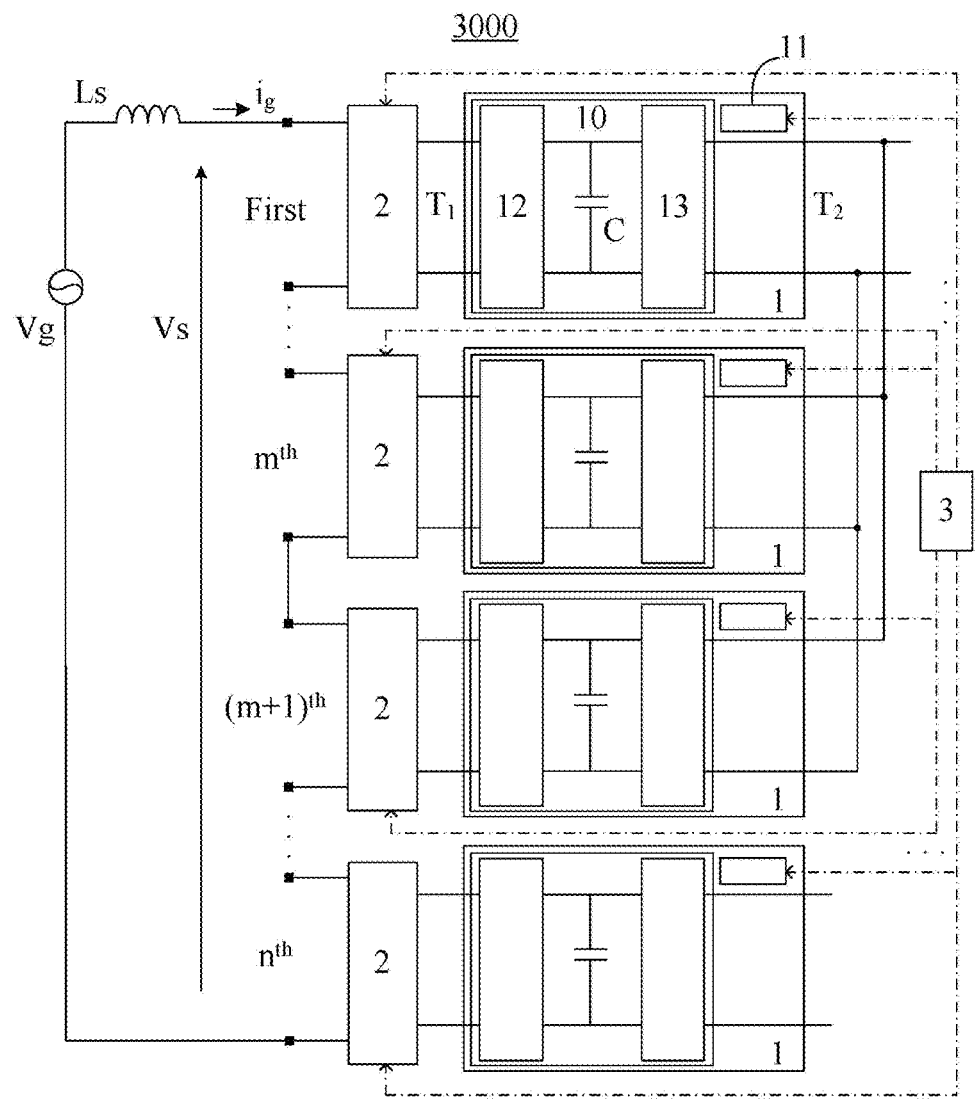
FIG. 7A is a schematic diagram of yet another embodiment of a cascade converter system of the present application.

FIG. 7A is a schematic diagram of yet another embodiment of a cascade converter system of the present application. FIG. 7A differs from FIG. 3 in that, in the cascade converter system 3000 as shown in FIG. 7A, the power conversion circuit 10 of each converter module 1 contains an AC-DC conversion circuit 12 and a DC-DC converter circuit 13. The AC-DC conversion circuit 12 is electrically connected to the first terminal T$_1$ of the converter module 1 and the DC bus capacitor C, and the DC-DC conversion circuit 13 is electrically connected to the second terminal T$_2$ of the converter module 1 and the DC bus capacitor C. The cascade converter system 3000 as shown in FIG. 7A may be served as a single-phase power electronic transformer. The AC-DC converter circuit 12 as shown in FIG. 7A may be a two-level or three-level full bridge/half bridge structure. The DC-DC converter circuit 13 may be a dual active bridge (DAB) or a resonant circuit (LLC) and the like, and the present disclosure is not limited thereto.

Figure 7B:
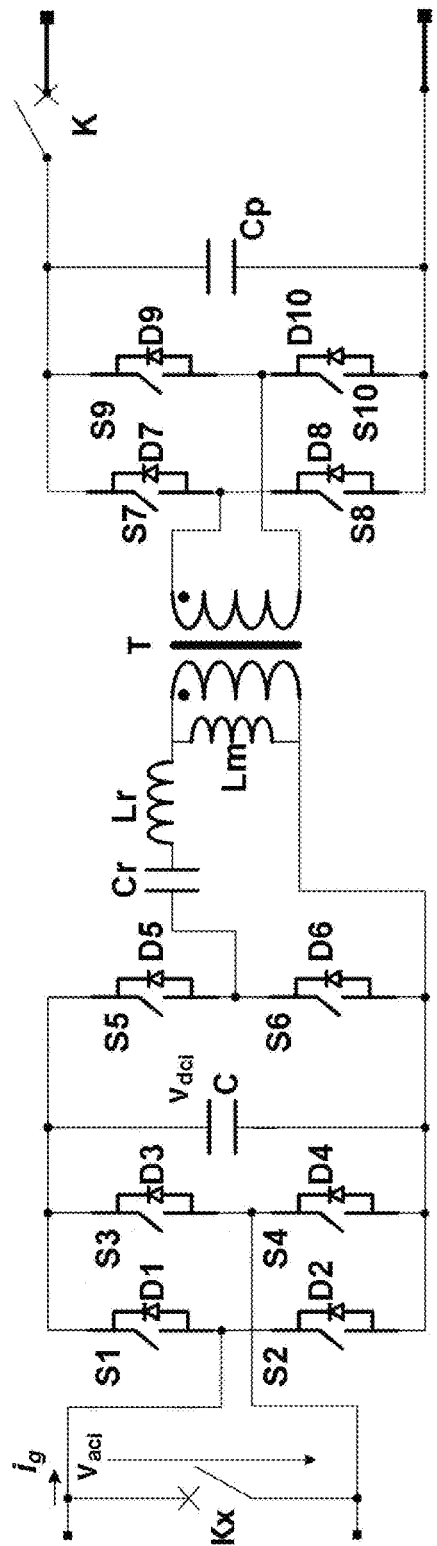
FIG. 7B is a schematic diagram of one embodiment of a bypass switch module and a corresponding converter module in FIG. 7A.

FIG. 7B is a schematic diagram of one embodiment of a bypass switch module and a corresponding converter module in FIG. 7A. As shown in FIG. 7B, a switch Kx corresponds to the bypass switch module 2, and a combination of the remaining elements corresponds to the converter module 1, i.e., corresponding to one converter module.

If the switch Kx is placed in an open position, the bypass switch module 2 is in the non-bypass state correspondingly, thus a phase current i$_g$ flows through the converter module 1 and generates a voltage drop V$_{aci}$ on the converter module 1.

In FIG. 7B, a combination of switches S1-S4 and diodes D1-D4 corresponds to the aforementioned AC-DC conversion circuit 12; and C is still the DC bus capacitor. If the switch Kx is placed in the open position, the DC bus capacitor C will be charged, to have a voltage of V$_{dci}$. A combination of switches S5-S10, diodes D5-D10, capacitors Cr and Cp, inductors Lr and Lm, a transformer T, and a switch K corresponds to the aforementioned DC-DC conversion circuit 13.

In the circuit as shown in FIG. 7B, the combination of switches S5-S10, diodes D5-D10, capacitors Cr and Cp, inductors Lr and Lm, transformer T, and switch K may be removed, and the combination of switches S1-S4, diodes D1-D4 and the DC bus capacitor C corresponds to a converter module in a static var generator (SVG).

Figure 8:
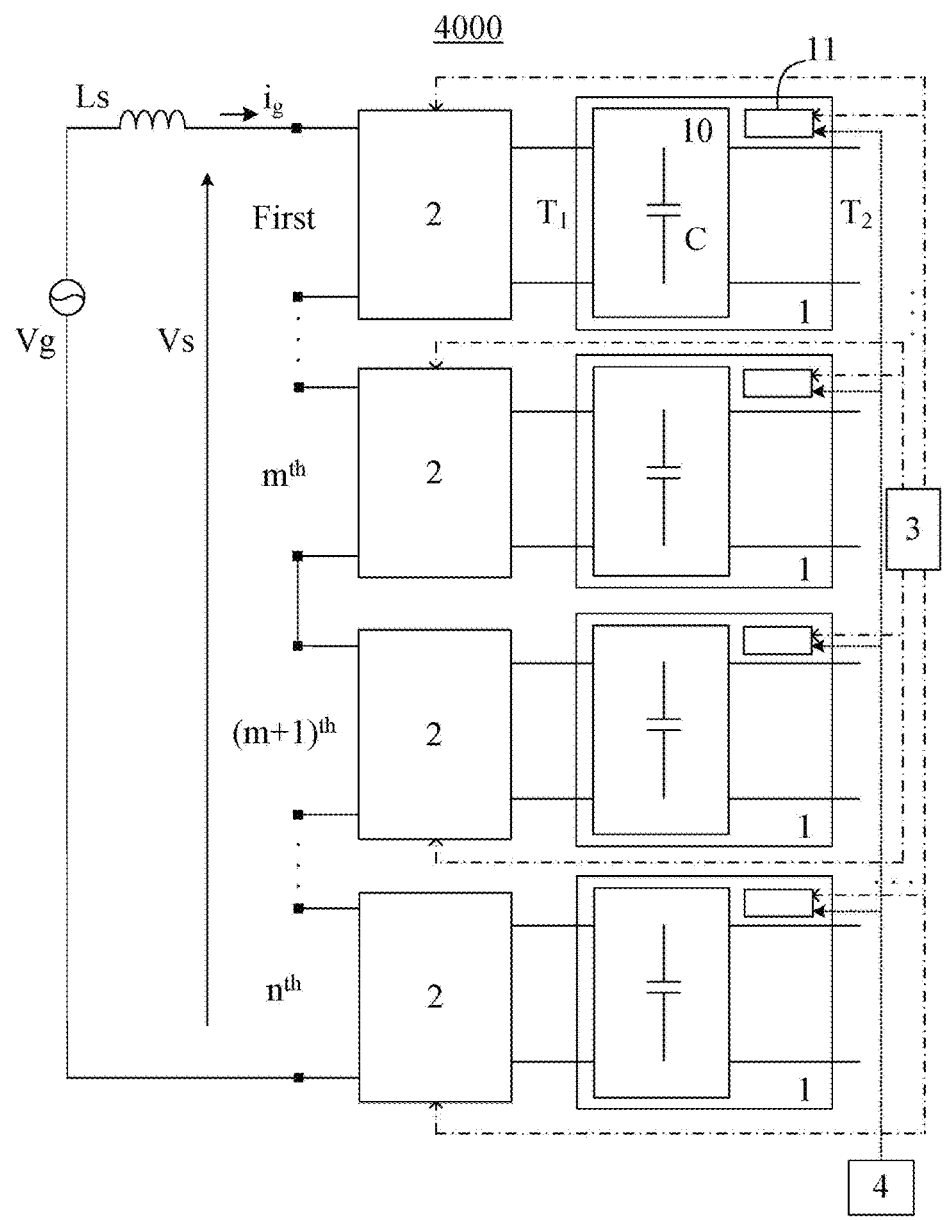
FIG. 8 is a schematic diagram of yet another embodiment of a cascade converter system of the present application.

FIG. 8 is a schematic diagram of yet another embodiment of a cascade converter system of the present application. FIG. 8 differs from FIG. 1A in that, the cascade converter system 4000 as shown in FIG. 8 further includes an auxiliary power source 4, configured to be electrically connected to the module controllers 11 of the aforementioned n converter modules 1 and supply power for respective module controllers 11. The auxiliary power source 4 may also be electrically connected to only one module controller 11 of the system and supply power for it. The present disclosure is not limited thereto. The dotted lines drawn from the auxiliary power source 4 in FIG. 8 indicate that the auxiliary power source 4 supplies power for each module controller 11. In this way, before any one of the aforementioned n converter modules 1 is put in the cascade converter system 4000, its module controller 11 may be in normal operating states, for example, being able to sample the voltage on DC bus capacitor C.

Figure 9:
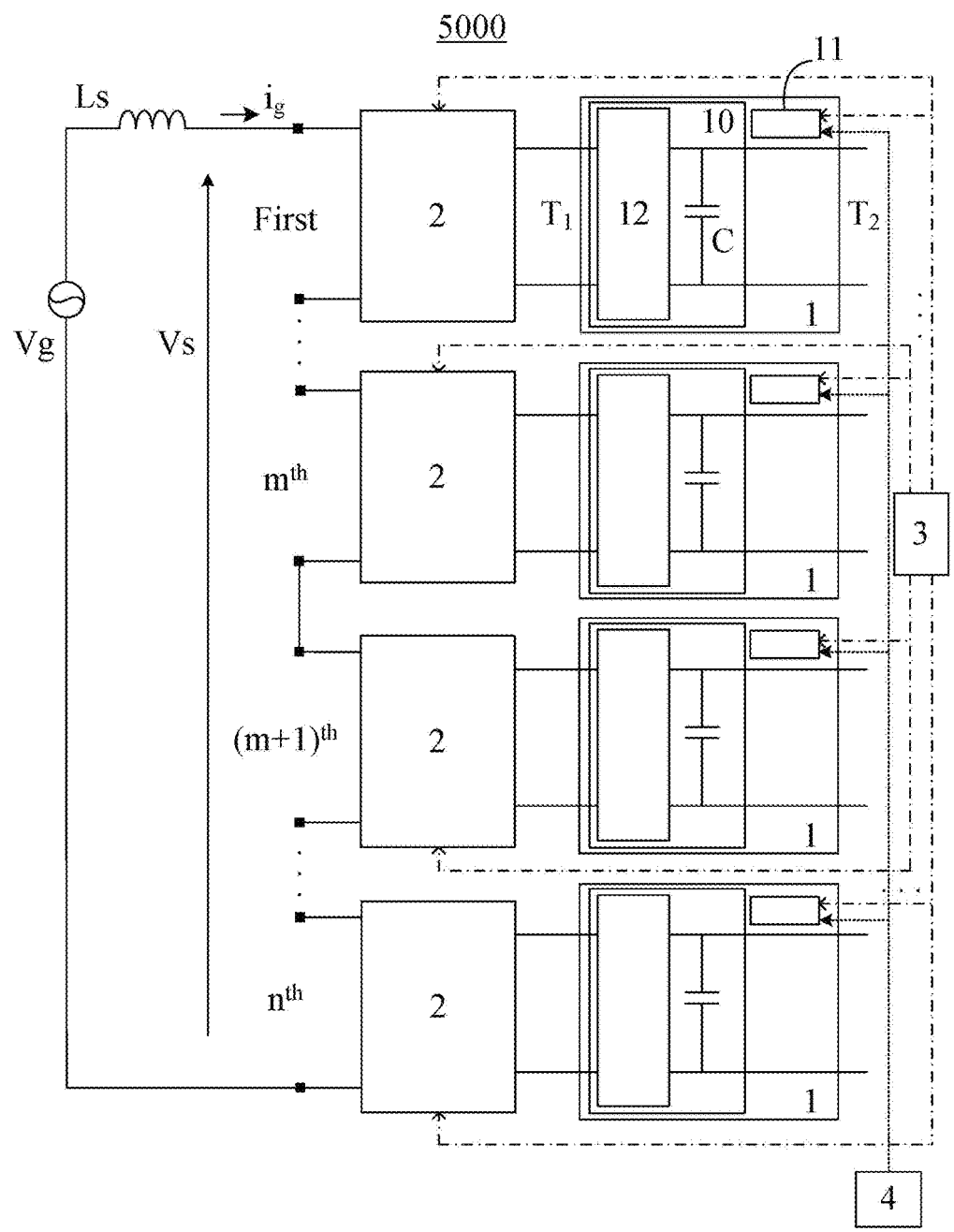
FIG. 9 is a schematic diagram of yet another embodiment of a cascade converter system of the present application.

FIG. 9 is a schematic diagram of yet another embodiment of a cascade converter system of the present application. FIG. 9 differs from FIG. 8 in that, the power conversion circuit 10 in the cascade converter system 5000 as shown in FIG. 9 contains the aforementioned AC-DC conversion circuit 12. The AC-DC conversion circuit 12 is configured to be electrically connected to the first terminal T$_1$ of the corresponding converter module 1 and the DC bus capacitor C. The cascade converter system 5000 as shown in FIG. 9 may be served as a single-phase cascaded var generator.

Figure 10:
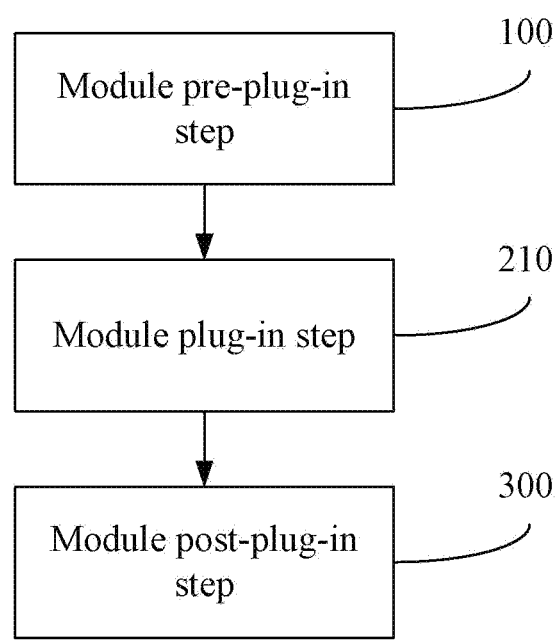
FIG. 10 is a flow chart of yet another embodiment of a method of putting a converter module of a cascade converter system into operation of the present application corresponding to the cascade converter system of FIG. 9.

FIG. 10 is a flow chart of yet another embodiment of a method of putting a converter module of a cascade converter system into operation of the present application corresponding to the cascade converter system of FIG. 9. Combining with FIG. 9, as shown in FIG. 10, the method of putting a converter module of a cascade converter system into operation of the present embodiment includes: a module pre-plug-in step 100, a module plug-in step 210 and a module post-plug-in step 300.

The module plug-in step 210 includes a pre-charging step. In the pre-charging step, after the aforementioned (m+1)$^{th}$ bypass switch module 2 is changed from the bypass state to the non-bypass state, the AC power source Vg charges the DC bus capacitor C of the (m+1)$^{th}$ converter module 1 through the aforementioned AC-DC conversion circuit 12.

Figure 11:
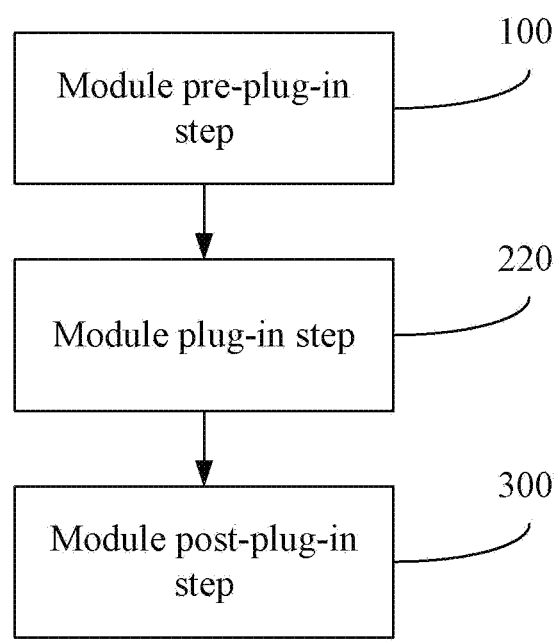
FIG. 11 is a flow chart of yet another embodiment of a method of putting a converter module of a cascade converter system into operation of the present application corresponding to the cascade converter system of FIG. 9.

FIG. 11 is a flow chart of yet another embodiment of a method of putting a converter module of a cascade converter system into operation of the present application corresponding to the cascade converter system of FIG. 9. Combining with FIG. 9, as shown in FIG. 11, the method of putting a converter module of a cascade converter system into operation of the present embodiment includes: a module pre-plug-in step 100, a module plug-in step 220 and a module post-plug-in step 300.

The module plug-in step 220 includes the aforementioned pre-charging step. In the pre-charging step, the system controller 3 communicates with the aforementioned module controllers 11 of the m converter modules 1, such that the m converter modules operate according to a third control signal, wherein the third control signal contains a third duty cycle signal D3 obtained according to following formula:

$$D3 = \frac{v_{ref} - \text{sgn}(i_g)v_{m+1}}{\sum_{i=1}^{m} v_{dci}}$$

wherein the $V_{ref}$ is a system voltage reference value, the sgn ( ) is a symbol function, the $i_g$ is a current flowing through the first terminal $T_1$ of the $(m+1)^{th}$ converter module 1, i.e., the aforementioned phase current. The $V_{dci}$ is a voltage of the DC bus capacitor C of the aforementioned $i^{th}$ converter module 1, for example, a sampled value of the voltage on the DC bus capacitor C of the cascade $i^{th}$ converter module 1. Herein, the $V_{m+1}$ represents a value of the voltage of the DC bus capacitor C of the aforementioned $(m+1)^{th}$ converter module 1 and it may be obtained by estimating or calculating. Herein, the $i^{th}$ is not limited to the $i^{th}$ of the system structure order, and it may be any one of the system structure.

Figure 12:
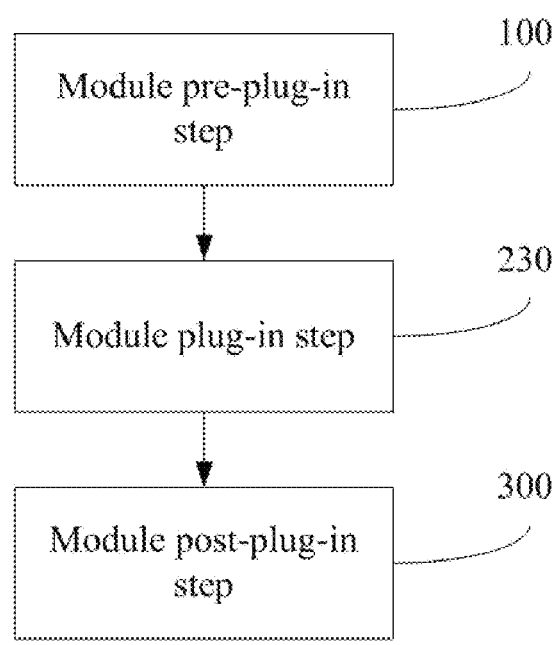
FIG. 12 is a flow chart of yet another embodiment of a method of putting a converter module of a cascade converter system into operation of the present application corresponding to the cascade converter system of FIG. 9.

FIG. 12 is a flow chart of yet another embodiment of a method of putting a converter module of a cascade converter system into operation of the present application corresponding to the cascade converter system of FIG. 9. Combining with FIG. 9, as shown in FIG. 12, the method of putting a converter module of a cascade converter system into operation of the present embodiment includes: a module pre-plug-in step 100, a module plug-in step 230 and a module post-plug-in step 300.

The module plug-in step 230 includes the aforementioned pre-charging step. In the pre-charging step, the system controller 3 communicates with the aforementioned module controller 11 of the $(m+1)^{th}$ converter module 1 to acquire the aforementioned $V_{m+1}$. In the present embodiment, the $V_{m+1}$ is a voltage sampled value of the DC bus capacitor C of the $(m+1)^{th}$ converter module 1 by the module controller 11 of the aforementioned $(m+1)^{th}$ converter module 1.

As another embodiment of the cascade converter system of the present application, the cascade converter system of the present application adopts carrier phase shifting control. In this way, In addition to controlling the corresponding first, second and third duty cycle signals of respective converter modules 1 before, when and after the aforementioned $(m+1)^{th}$ converter module 1 is put into the cascade converter system, the present application may also control corresponding phases of carriers of respective converter modules 1 before, when and after the aforementioned $(m+1)^{th}$ converter module 1 is put into the cascade converter system.

Figure 13:
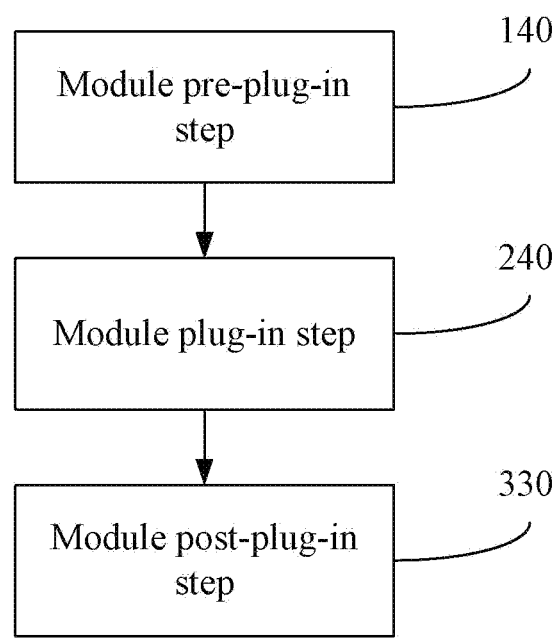
FIG. 13 is a flow chart of yet another embodiment of a method of putting a converter module of a cascade converter system into operation of the present application corresponding to the cascade converter system which adopts carrier phase shifting control.

FIG. 13 is a flow chart of yet another embodiment of a method of putting a converter module of a cascade converter system into operation of the present application corresponding to the cascade converter system which adopts carrier phase shifting control. Combining with FIG. 9, as shown in FIG. 13, the method of putting a converter module of a cascade converter system into operation of the present embodiment includes: a module pre-plug-in step 140, a module plug-in step 240 and a module post-plug-in step 330.

In the module pre-plug-in step 140, carriers of the m converter modules 1 are sequentially shifted by π/m according to the aforementioned first control signal.

In the module plug-in step 240, carriers of the m converter modules 1 are sequentially shifted by π/m according to the aforementioned third control signal 1.

In the module post-plug-in step 330, carriers of the m+1 converter modules are sequentially shifted by π/(m+1) according to the aforementioned second control signal.

Figure 14:
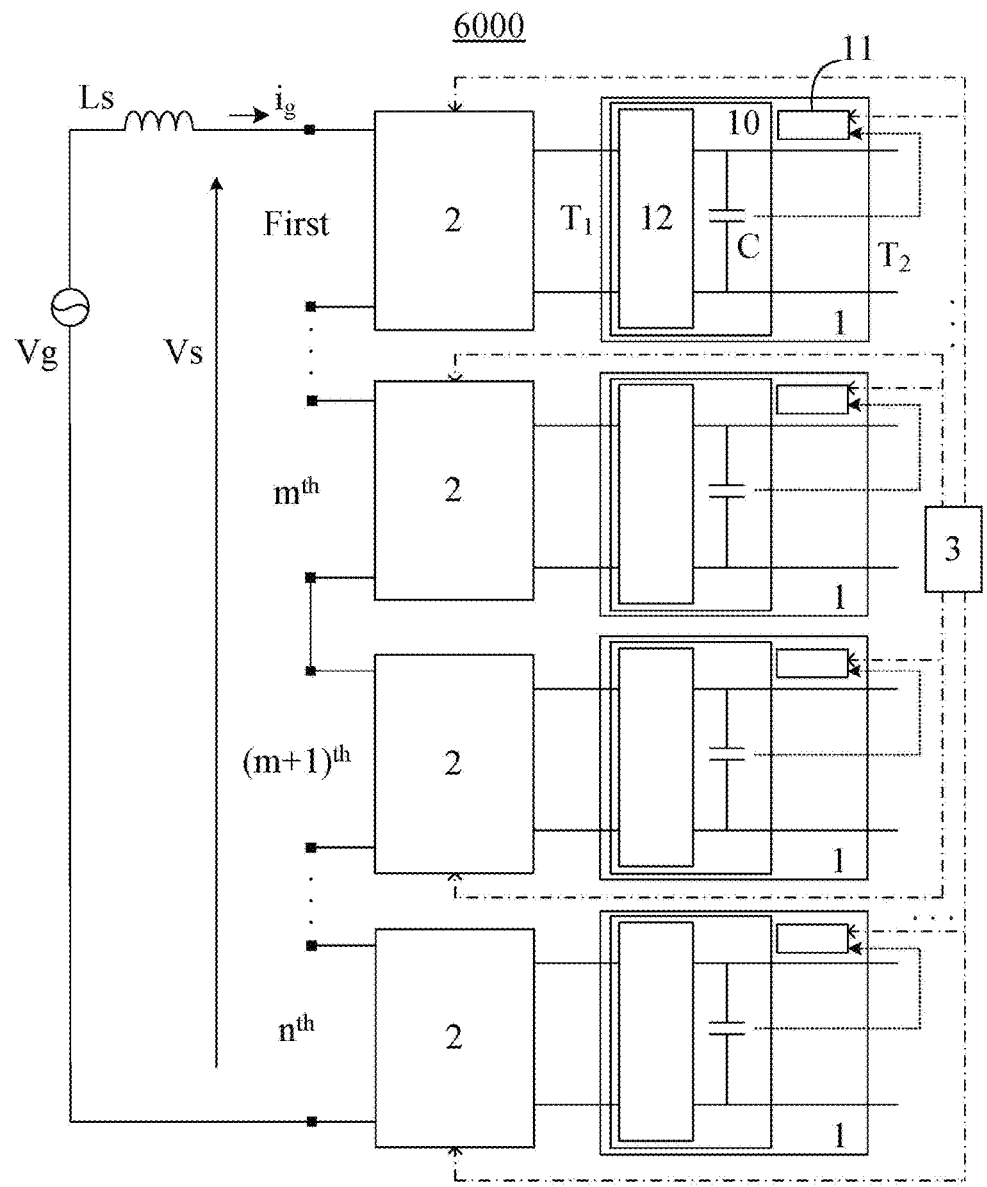
FIG. 14 is a schematic diagram of yet another embodiment of a cascade converter system of the present application.

FIG. 14 is a schematic diagram of yet another embodiment of a cascade converter system of the present application. FIG. 14 differs from FIG. 1A in that, in the cascade converter system 6000 as shown in FIG. 14, the power conversion circuit 100 in each converter module 1 contains the aforementioned AC-DC conversion circuit 12. The AC-DC conversion circuit 12 is electrically connected to the first terminal $T_1$ of the converter module 1 and the DC bus capacitor C. The module controller 11 is electrically connected to the DC bus capacitor C. The DC bus capacitor C supplies power for the module controller 11.

Figure 15:
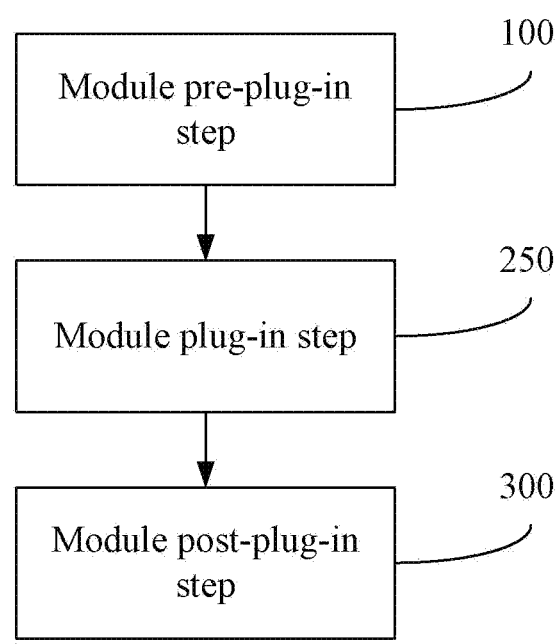
FIG. 15 is a flow chart of yet another embodiment of a method of putting a converter module of a cascade converter system into operation of the present application corresponding to the cascade converter system of FIG. 14.

FIG. 15 is a flow chart of yet another embodiment of a method of putting a converter module of a cascade converter system into operation of the present application corresponding to the cascade converter system of FIG. 14. Combining with FIG. 14, as shown in FIG. 15, the method of putting a converter module of a cascade converter system into operation of the present embodiment includes: a module pre-plug-in step 100, a module plug-in step 250 and a module post-plug-in step 300.

The module plug-in step 250 includes a pre-charging step. In the pre-charging step, after the aforementioned $(m+1)^{th}$ bypass switch module 2 is changed from the bypass state to the non-bypass state, the AC power source Vg charges the DC bus capacitor C of the $(m+1)^{th}$ converter module 1 through the AC-DC conversion circuit 12.

Figure 16:
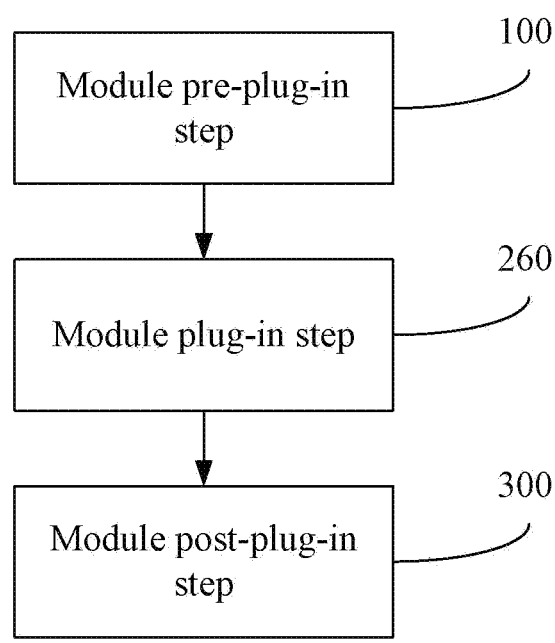
FIG. 16 is a flow chart of yet another embodiment of a method of putting a converter module of a cascade converter system into operation of the present application corresponding to the cascade converter system of FIG. 14.

FIG. 16 is a flow chart of yet another embodiment of a method of putting a converter module of a cascade converter system into operation of the present application corresponding to the cascade converter system of FIG. 14. Combining with FIG. 14, as shown in FIG. 16, the method of putting a converter module of a cascade converter system into operation of the present embodiment includes: a module pre-plug-in step 100, a module plug-in step 260 and a module post-plug-in step 300.

The module plug-in step 260 includes a pre-charging step. In the pre-charging step, before the DC bus capacitor C of the aforementioned $(m+1)^{th}$ converter module 1 is charged to a first voltage value, the system controller 3 communicates with respective module controllers 11 of the m converter modules, such that the m converter modules 1 operate according to a third control signal respectively, wherein the first voltage value is a minimum threshold of an operating voltage of the module controller 11 of the $(m+1)^{th}$ converter module 1, the third control signal contains the aforementioned third duty cycle signal D3, the third duty cycle signal D3 is obtained according to the aforesaid system voltage reference value $V_{ref}$, voltages of the DC bus capacitors C of m converter modules 1, and a value representing a voltage of the DC bus capacitor C of the $(m+1)^{th}$ converter module 1.

As an embodiment, the aforementioned third duty cycle signal D3 is obtained according to following formula:

$$D3 = \frac{v_{ref} - \text{sgn}(i_g)v_{m+1}}{\sum_{i=1}^{m} v_{dci}}$$

wherein the $V_{ref}$ is a system voltage reference value, the sgn ( ) is a symbol function, the $i_g$ is a current flowing through the first terminal $T_1$ of the $(m+1)^{th}$ converter module 1, i.e., the aforementioned phase current. The $V_{dci}$ is a voltage of the DC bus capacitor C of the aforementioned $i^{th}$ converter module 1, for example, a sampled value of the voltage on the DC bus capacitor C of the cascade $i^{th}$ converter module 1. Herein, the $V_{m+1}$ represents a value of the voltage of the DC bus capacitor C of the aforementioned $(m+1)^{th}$ converter module 1. Herein, the $i^{th}$ is not limited to the $i^{th}$ of the system structure order, and it may be any one of the system structure.

As an embodiment, the $V_{m+i}$ is a voltage predicted value of the DC bus capacitor C of the $(m+1)^{th}$ converter module 1, and obtained according to the time integral of the current $i_g$ at the first terminal $T_1$ of the $(m+1)^{th}$ converter module 1 and a capacitance value of the DC bus capacitor C of the $(m+1)^{th}$ converter module 1.

As an embodiment, the $V_{m+1}$ is obtained according to following formula:

$$v_{m+1} = \frac{\int_{t_0}^{t} i_g \, dt}{C_{ini}}$$

wherein the $t_0$ is a moment at which the system controller 3 controls the $(m+1)^{th}$ bypass switch module 2 to change from the bypass state to the non-bypass state, the t is the time period during which the DC bus capacitor C of the $(m+1)^{th}$ converter module 1 is charged, and the $C_{ini}$ is the capacitance value of the DC bus capacitor C of the $(m+1)^{th}$ converter module 1.

As another embodiment of the cascade converter system of the present application, the cascade converter system of the present application adopts carrier phase shifting control. In this way, In addition to controlling the corresponding first, second and third duty cycle signals of respective converter modules 1 before, when and after the aforementioned $(m+1)^{th}$ converter module 1 is put into the cascade converter system, the present application may also control corresponding phases of carriers of respective converter modules 1 before, when and after the aforementioned (m+1)$^{th}$ converter module 1 is put into the cascade converter system.

Figure 17:
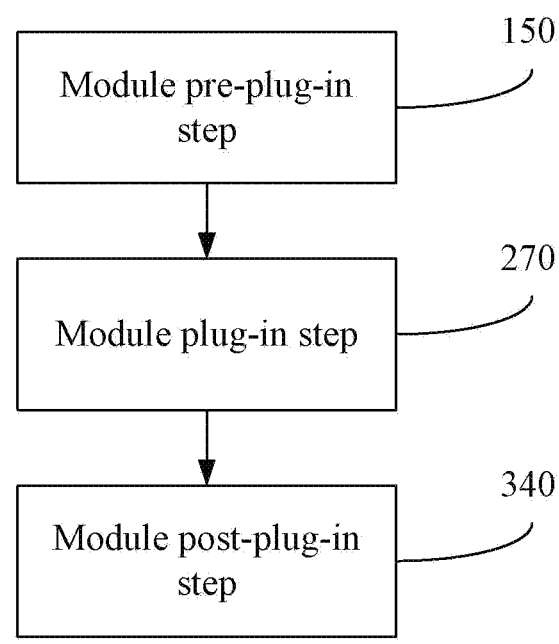
FIG. 17 is a flow chart of yet another embodiment of a method of putting a converter module of a cascade converter system into operation of the present application corresponding to the cascade converter system which adopts carrier phase shifting control.

FIG. 17 is a flow chart of yet another embodiment of a method of putting a converter module of a cascade converter system into operation of the present application corresponding to the cascade converter system which adopts carrier phase shifting control. Combining with FIG. 14, as shown in FIG. 17, the method of putting a converter module of a cascade converter system into operation of the present embodiment includes: a module pre-plug-in step 150, a module plug-in step 270 and a module post-plug-in step 340.

In the module pre-plug-in step 150, carriers of the m converter modules 1 are sequentially shifted by $\pi/m$ according to the aforementioned first control signal.

In the module plug-in step 270, carriers of the m converter modules 1 are sequentially shifted by $\pi/m$ according to the aforementioned third control signal.

In the module post-plug-in step 340, carriers of the m+1 converter modules 1 are sequentially shifted by $\pi/(m+1)$ according to the aforementioned second control signal.

Figure 18:
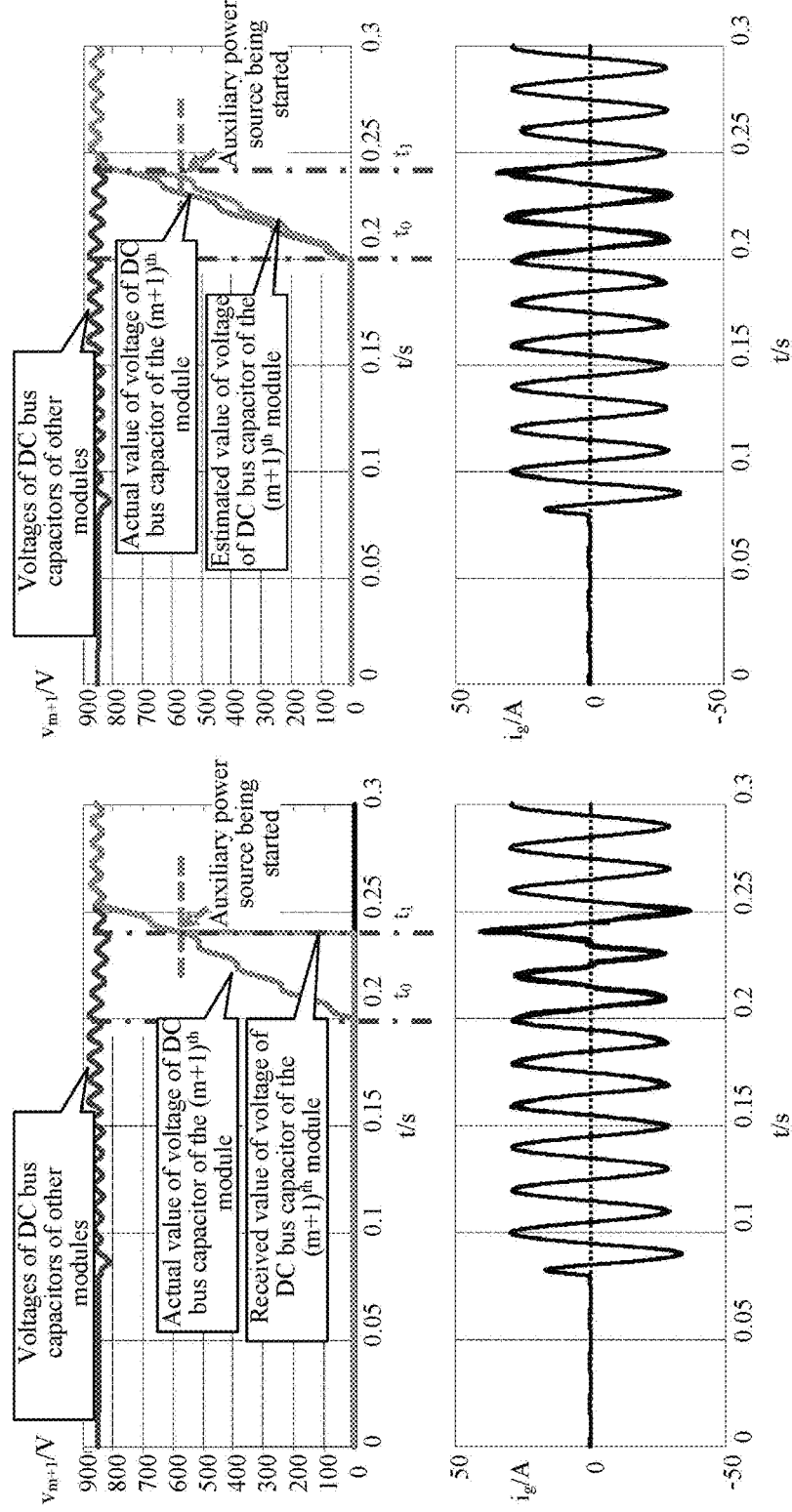
FIG. 18 is a waveform diagram which simulates the cascade converter system 6000 in FIG. 14 according to a method of putting a converter module of a cascade converter system into operation of the present application.

FIG. 18 is a waveform diagram which simulates the cascade converter system 6000 in FIG. 14 according to a method of putting a converter module of a cascade converter system into operation of the present application.

As shown in FIG. 18, the sub-graph on the left side shows a simulation waveform which does not adopt the method of putting a converter module of a cascade converter system into operation according to an embodiment of the present application. When the aforementioned $(m+1)^{th}$ converter module 1 is put at the time $t_0$, the voltage on the DC bus capacitor C is increased, that is, the $V_{m+1}$ rises from zero. However, since the charging of the DC bus capacitor C requires a process, for example, a sufficiently high voltage may be charged to until the time $t_1$, to reach the aforementioned first voltage value (i.e., a minimum threshold of an operating voltage of the module controller 11 of the $(m+1)^{th}$ converter module 1), the DC bus capacitor C may normally supply power to the module controller 11, and the module controller 11 may be started. Thus, during the time period of $t_0$-$t_1$, the voltage value (i.e., $V_{m+1}$) on the DC bus capacitor C of the $(m+1)^{th}$ converter module 1 received by the system controller 3 is zero, instead of its actual voltage. Because the voltage value (i.e., $V_{m+1}$) on the DC bus capacitor C of the $(m+1)^{th}$ converter module 1 cannot be obtained, the phase voltage Vs of the cascade converter system cannot be controlled to follow the reference voltage $V_{ref}$, thus large distortion occurs in the current $i_g$.

As shown in FIG. 18, sub-graph on the right side shows a simulation waveform which adopts the method of putting a converter module of a cascade converter system into operation of the present application. When the aforementioned $(m+1)^{th}$ converter module 1 is put at the time $t_0$, the voltage on the DC bus capacitor C is increased, that is, the $V_{m+1}$ rises from zero. Although voltage values on the DC bus capacitor C of the $(m+1)^{th}$ converter module 1 cannot be sampled or received during the time period of $t_0$-$t_1$, the system controller 3 uses a voltage prediction value (i.e. a real-time predicted $V_{m+1}$) of the DC bus capacitor C of the $(m+1)^{th}$ converter module 1 to replace its actual value, to control the cascade converter system, such that its phase voltage Vs may still follow the reference voltage $V_{ref}$ well, and thus the distortion of phase current $i_g$ was significantly reduced.

In addition, taking into account the possibility of failure of the auxiliary power source 4, the failure of the auxiliary power source 4 may cause the module controller 11 not to operate normally. In this case, if no corresponding protection measure is taken, it will cause the $(m+1)^{th}$ converter module 1 to be continuously in an unregulated rectified charge state, the DC bus capacitor C will be damaged due to overvoltage. The method of this embodiment may be adopted to facilitate fault detection.

At this time, the voltage predicted value $V_{m+1}$ of the DC bus capacitor C of the $(m+1)^{th}$ converter module 1 may be used as an input of a protecting signal. When $V_{m+1}$ exceeds a normal range but the $(m+1)^{th}$ converter module 1 is not started normally, it may be considered that the $(m+1)^{th}$ converter module 1 has failed, thus the aforementioned $(m+1)^{th}$ bypass switch module 2 can be switched back to the bypass state, to bypass the $(m+1)^{th}$ converter module 1 again.

In summary, through the above-mentioned adjustment of the cascade converter system and the method of putting a converter module of a cascade converter system into operation according to the embodiments of the present application, the AC side voltage Vs (i.e., the phase voltage) of the corresponding phase before, when and after the $(m+1)^{th}$ converter module 1 is put, may follow the phase reference voltage $V_{ref}$, and the low-order harmonics may be eliminated by carrier phase shifting, which reduces the transient overshoot at this stage.

The cascade converter system of an embodiment of the present application contains at least two cascaded converter modules, and a bypass switch module is connected in parallel at the first terminal of each converter module. When the bypass switch module is in the non-bypass state and thus the converter module is put into the running cascade converter system, the pulse generation mechanism of other converter modules is adjusted in real time, thus realizing the seamless putting of the converter module.

Through the method of putting a converter module of a cascade converter system into operation according to an embodiment of the present application, the pulse generation mechanism of the remaining cascaded converter modules are dynamically adjusted during the putting of a new converter module, which reduces the impact on the power grid at the AC side during the putting of the converter module, thus achieving the steady putting of the converter module.

The present disclosure has been described by the above-described related embodiments. However, the above-described embodiments are merely examples of the present application. It is to be noted that the disclosed embodiments do not limit the scope of the present disclosure. Rather, changes and modifications without departing from the spirit and scope of the present disclosure all belong to the patent protection scope of the present disclosure.

What is claimed is:

1. A method of putting a converter module of a cascade converter system into operation, wherein the cascade converter system comprises:
   n converter modules, wherein n>1, each of the converter modules comprises a first terminal, a power conversion circuit, a second terminal and a module controller, the first terminal is electrically connected to the power conversion circuit, the power conversion circuit is electrically connected to the second terminal, the power conversion circuit contains at least one DC bus capacitor, and the module controller is configured to control the power conversion circuit;
   n bypass switch modules, wherein the n bypass switch modules are connected in series and electrically connected to an AC power source, and the first terminals of the n converter modules are correspondingly connected in parallel with the n bypass switch modules, respectively; and
   a system controller, at least configured to control the n bypass switch modules to be in a bypass state or a non-bypass state,
   wherein the method comprises:
   a module pre-plug-in step: m bypass switch modules of the n bypass switch modules being in a non-bypass state, and remaining n-m bypass switch modules being in a bypass state, and the system controller communicating with the module controllers of the m non-bypassed converter modules, such that the m non-bypassed converter modules operate according to a first control signal, wherein 1≤m<n;
   a module plug-in step: the system controller controlling the $(m+1)^{th}$ bypass switch module to change from the bypass state to the non-bypass state; and
   a module post-plug-in step: the system controller communicating with the module controllers of the m+1 non-bypassed converter modules, such that the m+1 non-bypassed converter modules operate according to a second control signal.

2. The method of putting a converter module of a cascade converter system into operation according to claim 1, wherein in the module pre-plug-in step, the second terminals of the m non-bypassed converter modules are connected in parallel, and in the module post-plug-in step, the second terminals of the m+1 non-bypassed converter modules are connected in parallel, wherein the first control signal is obtained according to voltages of the DC bus capacitors of the m non-bypassed converter modules and a system voltage reference value, and the second control signal is obtained according to voltages of the DC bus capacitors of the m+1 non-bypassed converter modules and the system voltage reference value.

3. The method of putting a converter module of a cascade converter system into operation according to claim 2, wherein the first control signal contains a first duty cycle signal, the second control signal contains a second duty cycle signal, the first duty cycle signal is obtained according to the system voltage reference value and voltages of the DC bus capacitors of the m non-bypassed converter modules, and the second duty cycle signal is obtained according to the system voltage reference value and voltages of the DC bus capacitors of the m+1 non-bypassed converter modules.

4. The method of putting a converter module of a cascade converter system into operation according to claim 3, wherein the first duty cycle signal D1 and the second duty cycle signal D2 are obtained according to following formula:

$$D1 = \frac{V_{ref}}{\sum_{i=1}^{m} v_{dci}}$$

and $$D2 = \frac{V_{ref}}{\sum_{i=1}^{m+1} v_{dci}}$$

wherein the $V_{ref}$ is the system voltage reference value, and the $V_{dci}$ is a voltage of the DC bus capacitor of the $i^{th}$ converter module.

5. The method of putting a converter module of a cascade converter system into operation according to claim 3, wherein the cascade converter system adopts carrier phase shifting control, in the module pre-plug-in step, carriers of the m non-bypassed converter modules are sequentially shifted by π/m according to the first control signal, and in the module post-plug-in step, carriers of the m+1 non-bypassed converter modules are sequentially shifted by π/(m+1) according to the second control signal.

6. The method of putting a converter module of a cascade converter system into operation according to claim 3, in the module pre-plug-in step, the module controllers of the m non-bypassed converter modules make an adjustment component to be superimposed on the respective first duty cycle ratio signals of the m non-bypassed converter modules, and the adjustment component is obtained according to a voltage of the DC bus capacitor of the corresponding converter module.

7. The method of putting a converter module of a cascade converter system into operation according to claim 2, wherein the power conversion circuit contains an AC-DC conversion circuit and a DC-DC converter circuit, the AC-DC conversion circuit is electrically connected to the first terminal and the DC bus capacitor, and the DC-DC conversion circuit is electrically connected to the second terminal and the DC bus capacitor.

8. The method of putting a converter module of a cascade converter system into operation according to claim 1, wherein the cascade converter system further comprises an auxiliary power source, configured to be electrically connected and supply power to the module controller of the $(m+1)^{th}$ converter module.

9. The method of putting a converter module of a cascade converter system into operation according to claim 8, wherein the power conversion circuit contains an AC-DC conversion circuit, configured to be electrically connected to the first terminal and the DC bus capacitor, the module plug-in step further comprises:
a pre-charging step, after the $(m+1)^{th}$ bypass switch module is changed from the bypass state to the non-bypass state, the AC power source charging the DC bus capacitor of the $(m+1)^{th}$ converter module through the AC-DC conversion circuit.

10. The method of putting a converter module of a cascade converter system into operation according to claim 9, wherein the pre-charging step further comprises:
the system controller communicating with the module controllers of the m non-bypassed converter module, such that the m non-bypassed converter modules operating according to a third control signal, and the third control signal containing a third duty cycle signal obtained according to following formula:

$$D3 = \frac{v_{ref} - \mathrm{sgn}(i_g)v_{m+1}}{\sum_{i=1}^{m} v_{dci}}$$

wherein the $V_{ref}$ is a system voltage reference value, the sgn ( ) is a symbol function, the $i_g$ is a current through the first terminal of the $(m+1)^{th}$ converter module, the $V_{dci}$ is a voltage of the DC bus capacitor of the $i^{th}$ converter module, and the $V_{m+1}$ represents a value of a voltage of the DC bus capacitor of the $(m+1)^{th}$ converter module.

11. The method of putting a converter module of a cascade converter system into operation according to claim 10, wherein the pre-charging step further comprises:
the system controller communicating with the module controller of the $(m+1)^{th}$ converter module to acquire the $V_{m+1}$, wherein the $V_{m+1}$ is a sampled value of the voltage of the DC bus capacitor of the $(m+1)^{th}$ converter module sampled by the module controller of the $(m+1)^{th}$ converter module.

12. The method of putting a converter module of a cascade converter system into operation according to claim 11, wherein the cascade converter system adopts carrier phase shifting control, in the module pre-plug-in step, carriers of the m non-bypassed converter modules are sequentially shifted by $\pi/m$ according to the first control signal, and in the module plug-in step, carriers of the m non-bypassed converter modules are sequentially shifted by $\pi/m$ according to the third control signal, and in the module post-plug-in step, carriers of the m+1 non-bypassed converter modules are sequentially shifted by $\pi/(m+1)$ according to the second control signal.

13. The method of putting a converter module of a cascade converter system into operation according to claim 1, wherein the power conversion circuit contains an AC-DC conversion circuit, the AC-DC conversion circuit is electrically connected to the first terminal and the DC bus capacitor, the module controller is electrically connected to the DC bus capacitor, and the DC bus capacitor supplies power for the module controller, wherein the module plug-in step further comprises:
a pre-charging step, after the $(m+1)^{th}$ bypass switch module is changed from the bypass state to the non-bypass state, the AC power source charging the DC bus capacitor of the $(m+1)^{th}$ converter module through the AC-DC conversion circuit.

14. The method of putting a converter module of a cascade converter system into operation according to claim 13, wherein the pre-charging step further comprises:
before the DC bus capacitor of the $(m+1)^{th}$ converter module is charged to a first voltage value, the system controller communicating with the module controllers of the m non-bypassed converter modules, such that the m non-bypassed converter modules operate according to a third control signal respectively, wherein the first voltage value is a minimum threshold of an operating voltage of the module controller of the $(m+1)^{th}$ converter module, the third control signal contains a third duty cycle signal, the third duty cycle signal is obtained according to the system voltage reference value, voltages of the DC bus capacitors of m non-bypassed converter modules, and a value representing a voltage of the DC bus capacitor of the $(m+1)^{th}$ converter module.

15. The method of putting a converter module of a cascade converter system into operation according to claim 14, wherein the third duty cycle signal is obtained according to following formula:

$$D3 = \frac{v_{ref} - \mathrm{sgn}(i_g)v_{m+1}}{\sum_{i=1}^{m} v_{dci}}$$

wherein the $V_{ref}$ is a system voltage reference value, the sgn ( ) is a symbol function, the $i_g$ is a current through the first terminal of the $(m+1)^{th}$ converter module, the $V_{dci}$ is a voltage of the DC bus capacitor of the $i^{th}$ converter module, and the $V_{m+1}$ represents the voltage of the DC bus capacitor of the $(m+1)^{th}$ converter module.

16. The method of putting a converter module of a cascade converter system into operation according to claim 15, wherein the $V_{m+1}$ is a predicted value of the voltage of the DC bus capacitor of the $(m+1)^{th}$ converter module, and obtained according to a time integral of the current through the first terminal of the $(m+1)^{th}$ converter module and a capacitance value of the DC bus capacitor of the $(m+1)^{th}$ converter module.

17. The method of putting a converter module of a cascade converter system into operation according to claim 16, wherein the $V_{m+1}$ is obtained according to following formula:

$$v_{m+1} = \frac{\int_{t_0}^{t} i_g \, dt}{C_{ini}}$$

wherein the $t_0$ is a moment at which the system controller controls the $(m+1)^{th}$ bypass switch module to change from the bypass state to the non-bypass state, the t is a time period during which the DC bus capacitor of the $(m+1)^{th}$ converter module is charged, and the $C_{ini}$ is the capacitance value of the DC bus capacitor of the $(m+1)^{th}$ converter module.

18. The method of putting a converter module of a cascade converter system into operation according to claim 17, wherein the cascade converter system adopts carrier phase shifting control, in the module pre-plug-in step, carriers of the m non-bypassed converter modules are sequentially shifted by $\pi/m$ according to the first control signal, in the module plug-in step, carriers of the m non-bypassed converter modules are sequentially shifted by $\pi/m$ according to the third control signal, and in the module post-plug-in step, carriers of the m+1 non-bypassed converter modules are sequentially shifted by $\pi/(m+1)$ according to the second control signal.

19. A cascade converter system, comprising:
n converter modules, wherein n>1, each of the converter modules comprises a first terminal, a power conversion circuit, a second terminal and a module controller, the first terminal is electrically connected to the power conversion circuit, the power conversion circuit is electrically connected to the second terminal, the power conversion circuit contains at least one DC bus capacitor, and the module controller is configured to control the power conversion circuit;
n bypass switch modules, wherein the n bypass switch modules are connected in series and electrically connected to an AC power source, the first terminals of the n converter modules are correspondingly connected in parallel with the n bypass switch modules respectively; and
a system controller, at least configured to control the n bypass switch modules to be in a bypass state or a non-bypass state, wherein the cascade converter system operates according to the method according to claim 1.

20. The cascade converter system according to claim 19, wherein the cascade converter system operates according to the method according to claim 2.

\* \* \* \* \*